United States Patent

Okabe et al.

[11] Patent Number: 6,018,506
[45] Date of Patent: Jan. 25, 2000

[54] DISC REPRODUCING APPARATUS AND METHOD

[75] Inventors: Mitsuru Okabe; Takeshi Hachimori; Hidekazu Nakai, all of Kanagawa, Japan

[73] Assignee: Sony Corporation, Tokyo, Japan

[21] Appl. No.: 09/056,359

[22] Filed: Apr. 7, 1998

Related U.S. Application Data

[63] Continuation of application No. PCT/JP97/02821, Aug. 12, 1997.

[30] Foreign Application Priority Data

Aug. 14, 1996 [JP] Japan .................................. 8-214490
Oct. 3, 1996 [JP] Japan .................................. 8-283443

[51] Int. Cl.[7] ............................................... G11B 17/22
[52] U.S. Cl. ....................................................... 369/32
[58] Field of Search ................................. 369/32, 50, 60, 369/33, 47, 48, 58, 275.3; 386/126, 125

[56] References Cited

U.S. PATENT DOCUMENTS 5,343,452  8/1994  Maeda et al. .............................. 369/32
5,412,628  5/1995  Yamazaki et al. ......................... 369/32
5,706,260  1/1998  Kishi et al. ............................... 369/32
5,768,236  6/1998  Kihara ....................................... 369/60
5,881,031  3/1999  Asano et al. .............................. 369/32

*Primary Examiner*—Tan Dinh
*Attorney, Agent, or Firm*—Limbach & Limbach L.L.P.

[57] ABSTRACT

A disc reproducing device and a disc reproducing method for reproducing a disc-shaped recording medium (combined disc) on which first data to be reproduced at a first reproducing rate and second data to be reproduced at a second reproducing rate faster than the first reproducing rate are recorded, wherein the first data and second data are recorded in separate areas on the disc. The disc is rotatable at a second reproducing rate. Responsive to a readout command, data is read out from a desired position on the disc, and output data is checked as to whether it is the first data or the second data. If the data is the first data, the output data is stored in the buffer memory unit at the second reproducing rate. On the other hand, the first data of the buffer memory unit is read out at a first reproducing rate, while the second data is accessed if the first data is not being read out from the disc. During reproduction of the combined disc, the disc can be reproduced at a multiple speed to enable the CD-DA data and the CD-ROM data to be read out time-divisionally in parallel.

14 Claims, 13 Drawing Sheets

| TRACK NUMBER | POINT | MINUTE | SECOND | FRAME NUMBER | 0 | P MINUTE | P SECOND | FRAME NUMBER |
|---|---|---|---|---|---|---|---|---|
| | | 00~74 | 00~59 | 00~74 | | 00~74 | 00~59 | 00~74 |
| T No 01~99 | 01~99 | \multicolumn{3}{c}{TIME ELAPSED IN TRACK} | 0 | \multicolumn{3}{c}{ABSOLUTE TIME IN POINT CONTENTS} |
| 8 | 8 | 8 | 8 | 8 | 8 | 8 | 8 | 8 |

MODE 0

| SYNC SIGNAL | HEADER | | | | ALL ZERO |
|---|---|---|---|---|---|
| | BLOCK ADDRESS | | | MODE 0 | |
| | MINUTE | SECOND | BLOCK | | |
| (12) | (1) | (1) | (1) | (1) | (2,336) |

MODE 1

| SYNC SIGNAL | HEADER | | | | USER DATA | ERROR CORRECTION CODE | SPACE | ERROR CORRECTION CODE | |
|---|---|---|---|---|---|---|---|---|---|
| | BLOCK ADDRESS | | | MODE 1 | | | ALL ZERO | P PARITY | Q PARITY |
| | MINUTE | SECOND | BLOCK | | | | | | |
| (12) | (1) | (1) | (1) | (1) | (2,048) | (4) | (8) | (172) | (104) |

MODE 2

| SYNC SIGNAL | HEADER | | | | USER DATA |
|---|---|---|---|---|---|
| | BLOCK ADDRESS | | | MODE 2 | |
| | MINUTE | SECOND | BLOCK | | |
| (12) | (1) | (1) | (1) | (1) | (2,336) |

|←————————— SCRAMBLE AREA —————————→|
|←——————— 2,352 BYTES (1/15 SEC) ———————→|

MODE 2 (FORM 1)

| SYNC SIGNAL | HEADER | | | | SUB-HEADER | USER DATA | ERROR CORRECTION CODE | ERROR CORRECTION CODE | |
|---|---|---|---|---|---|---|---|---|---|
| | BLOCK ADDRESS | | | MODE 2 | | | | P PARITY | Q PARITY |
| | MINUTE | SECOND | BLOCK | | | | | | |
| (12) | (1) | (1) | (1) | (1) | (8) | (2,048) | (4) | (172) | (104) |

MODE 2 (MODE 2)

| SYNC SIGNAL | HEADER | | | | SUB-HEADER | USER DATA | RESERVE |
|---|---|---|---|---|---|---|---|
| | BLOCK ADDRESS | | | MODE 2 | | | |
| | MINUTE | SECOND | BLOCK | | | | |
| (12) | (1) | (1) | (1) | (1) | (8) | (2,048) | (4) |

FIG.13

DISC REPRODUCING APPARATUS AND METHOD

This application is a continuation of international application No. PCT/JP9/02821, filed Aug. 12, 1997, pending.

TECHNICAL FIELD

This invention relates to a disc reproducing apparatus and method for reproducing a recording medium, having recorded thereon data having different disc rotational velocities at the time of reproduction, for reading out data.

BACKGROUND ART

A so-called compact disc (CD), among disc-shaped recording mediums, has many standards, which can be roughly classified into a standard for a compact disc-digital audio (CD-DA) and a compact disc-read-only memory (CD-ROM).

The CD-DA is a standard for audio. On the disc of the CD-DA standard (referred to hereinafter as a CD-DA disc), digital audio data, generated on sampling analog audio signals, are recorded with a so-called constant linear velocity (CLV). Thus, when reproducing audio signals from the CD-DA disc, the latter is run in rotation at a constant linear velocity (CLV) and the digital audio data read out from the disc at a constant reproducing rate is digital/analog converted for regenerating analog audio signals. For the above-mentioned constant linear velocity, the velocity of 1.2 m/s to 1.4 m/s is prescribed.

On the other hand, the CD-ROM, which is the standard for a replay-only memory employing the CD, can store various information items of not less than hundreds of megabyte on one disc. The disc conforming to the CD-ROM standard can store various data such as computer programs, audio data, video data or letter data. Since the data recorded on the CD-ROM disc is reproduced by a computer, the audio data recorded on the CD-ROM is handled similarly to the above-mentioned computer data, video data or letter data.

In the following description, the audio data of the CD-ROM standard is termed CD-DA data, while the data of the CD-ROM standard is termed CD-ROM data, for demarcation therebetween. Although the CD-ROM disc is generally used as a read-only recording medium, there is also such a disc type on which the user can write data. In the CD-DA disc or the CD-ROM disc, the recorded information is managed by a series of domains termed tracks. One to a maximum of 99 tracks can be recorded on a sole disc. Audio data is recorded on these tracks of the CD-DA disc.

It should be noted that the CD-ROM, which is one of the CD standards, is reproduced by a computer as described above, so that, depending on the processing capability of the computer and that of the disc driving device, the CD-ROM disc can be read at a faster rate than the reproducing speed of the CD-DA disc. That is, in a computer employing the CD-ROM disc as an external recording medium, the CD-ROM disc can be rotated at an elevated velocity for retrieving and reading out desired data from the CD-ROM disc, while data can be reproduced in accordance with a random-access system. At this time, the rotational velocity used in reading out CD-ROM data from the CD-ROM disc is significantly faster than that used in reproducing audio data from the CD-DA disc.

Specifically, if the playback speed used in reproducing the CD-DA disc is the standard playback speed (or the usual playback speed), the CD-ROM disc can be reproduced at double the standard playback speed (double-speed reproduction), at four times the standard playback speed (quadrupled-speed reproduction) or at six times the standard playback speed (sextupled-speed reproduction). Recently, octatupled playback speed (eight times the standard playback speed) or the 10-tupled playback speed (ten times the standard playback speed) are making their debut. With the constant linear velocity, the rotational velocity in reproducing the CD-DA disc is approximately 500 rpm and approximately 200 rpm on the inner and outer disc rim sides, respectively. On the other hand, if the CD-ROM disc is reproduced at, for example, the 10-tupled speed, by the constant linear velocity, the rotational velocity in reproducing the disc is approximately 5000 rpm and approximately 2000 rpm on the inner and outer disc rim sides, respectively. In the following description, the playback velocity faster than the double speed is collectively termed multiple-speed reproduction.

An illustrative structure of a disc reproducing device, capable of reproducing the above-mentioned CD-DA disc or a CD-ROM disc, is shown in FIG. 16. The structure of FIG. 16 is that of a CD-ROM drive capable of reproducing a CD-DA disc as well.

In FIG. 16, a disc 110, which is the above-mentioned CD-DA disc or CD-ROM disc, is run in rotation by a spindle motor 121.

An optical pickup 111 converges and illuminates a laser light beam on the disc 110 for reading out signals recorded thereon. The signals read out from the disc 110 by the optical pickup 111 are routed to a RF amplifier 112.

The RF amplifier 112 includes an automatic power control (APC) circuit for automatically controlling the laser power of a laser diode of the optical pickup 111. An output of the RF amplifier 112 is routed to a servo circuit 113.

The servo circuit 113 detects focusing error signals and tracking error signals, based on the output of the RF amplifier 112, and routes these error signals to a biaxial driver 118. This biaxial driver 118 drives a biaxial actuator of the optical pickup 111 based on the focusing error signals and the tracking error signals. This realizes the focusing servo and the tracking servo.

The servo circuit 113 also generates sled control signals for moving the optical pickup 111 to a target radial position of the disc, based on the control from a CPU 123, and sends these sled control signals to a sled driver 119. The sled driver 119, receiving the sled control signals, drives a sled motor of a sled unit, not shown. The optical pickup 111 is moved along a sled rail.

The output of the RF amplifier 112, via the servo circuit 113, is routed to a signal processing circuit 114. Since the signals recorded on the disc 110 are modulated signals modulated by so-called eight-to-fourteen modulation (EFM), the signal processing circuit 114 demodulates the EFM signals. Moreover, since error correction codes by cross interleave Reed-Solomon code (CIRC) is appended to the recorded signals, the signal processing circuit 114 corrects the recorded signal for errors using the error correction code.

If the disc 110 is the CD-DA disc, the signals demodulated and corrected for errors by the signal processing circuit 114 become the above-mentioned CD-DA data which are converted by a digital/analog (D/A) converter 124 into analog audio signals so as to be outputted at an audio output terminal 125.

On the other hand, if the disc 110 is the CD-ROM disc, the signals demodulated and corrected for errors by the signal processing circuit 114 are routed to a CD-ROM decoder 115. Since the CD-ROM data recorded on the disc 110 which is the CD-ROM disc has the error detection and correction codes further appended thereto in accordance with the CD-ROM standards, the CD-ROM decoder 115 detects and corrects the errors, that is decodes the data. The CD-ROM data, decoded by the CD-ROM decoder 115, is routed via an interfacing circuit 116 and an output terminal 117 to, for example, a downstream side host computer.

The signal processing circuit 114, performing the above-described demodulation and error correction, generates a disc rotating speed control signal for performing the CLV control from the signals read out from the disc 110. If the disc 110 is the CD-DA disc, the disc rotating speed control signal is a signal used for rotation-controlling the disc 110 to the above-mentioned standard reproducing velocity, whereas, if the disc 110 is the CD-ROM disc, the disc rotating speed control signal is a signal used for rotation-controlling the disc 110 to the above-mentioned multiple reproducing velocity.

The disc rotating speed control signal is routed to a spindle driver 120 which then generates a driving voltage for driving the spindle motor 121 from the disc rotating speed control signal.

Among the CD standards, there is such a standard in which audio data of the CD-DA standards (CD-DA data) and the CD-ROM data of the CD-ROM standards are recorded in separate areas of the same disc. In the following explanation, this disc is termed a combined disc.

This combined disc has a recording area for recording the CD-ROM data of the CD-ROM standard (referred to hereinafter as a CD-ROM area 202) on the inner disc rim side, whilst a recording area for recording CD-DA data of the CD-DA standard (referred to as a CD-DA area 203) on the outer disc rim side, as shown in FIG. 17. The CD-ROM area 202 and the CD-DA area 203 are provided separately from each other. In the embodiment of FIG. 17, the CD-DA area 203 is provided on the outer disc rim side, whilst the CD-ROM area 202 is provided on the inner disc rim side, these areas 203, 202 making up a program area 205. A lead-in area 201 and a lead-out area 204 are provided on the innermost and outermost areas of the disc, respectively.

The disc reproducing device of FIG. 16 can reproduce a disc 110 which is the above-described combined disc. In this case, the CD-ROM data, reproduced from the CD-ROM area 202, is outputted at the output terminal 117 through a path by which the CD-ROM disc is reproduced. On the other hand, the CD-DA data, reproduced from the CD-DA area 203 of the disc 110, is outputted at an audio output terminal 125 through a path by which the CD-DA disc is reproduced.

Since the data recorded in the CD-ROM area 202 of the disc 110 which is the above-mentioned combined disc is the CD-ROM data, the CD-ROM area 202 can be reproduced by the disc reproducing device by multiple speed reproduction as in the case of reproducing the CD-ROM disc.

However, if the CD-DA area 203 of the combined disc is reproduced by the above disc reproducing device, the reproduction needs to be preformed with the above-mentioned standard reproducing speed, because the data recorded on the CD-DA area 203 is the CD-DA data.

Thus, there is produced a difference in the reproducing speed when reproducing the CD-ROM area 202 and when reproducing the CD-DA area 203. This difference is accentuated especially when the CD-ROM area 202 is reproduced with the quadrupled reproducing speed. If, in the disc reproducing device designed for coping with 10-tupled speed, the combined disc, having the CD-DA area 203 on its outer disc rim side and the CD-ROM area 202 on its inner disc rim side, the rotating speed of the disc is 200 rpm and 5000 rpm on the outer and inner disc rim sides, respectively, if the disc is reproduced with CLV.

For varying the rotating speed of the disc in a range from 200 to 5000 rpm, a significant amount of torque is required of the spindle motor. Thus, with this type of the disc reproducing device, the spindle motor is increased in size to render it difficult to reduce the size of the device. Moreover, with this type of the disc reproducing device, the spindle motor suffers from increased power consumption and concomitantly increased heat evolution. This increased power consumption is not desirable in applying the disc reproducing device to a battery-driven portable terminal.

Moreover, if the CD-ROM area 202 and the CD-DA area 203 are alternately reproduced, this speed difference imposes a significant load on the spindle motor designed for rotating the disc. Specifically, if the CD-ROM area 202 is first reproduced and subsequently the CD-DA area 203 is reproduced, the rotating speed of the disc needs to be dropped at a time from the multiple disc rotating speed to the standard disc rotating speed. Conversely, if the CD-DA area 203 is reproduced and subsequently the CD-ROM area 202 is reproduced, the rotating speed of the disc needs to be increased at a time from the standard disc rotating speed to the double disc rotating speed. This imposes a significant load on the spindle motor resulting in the shortened service life of the disc driving mechanism of the disc reproducing device.

In addition, if the CD-ROM area 202 and the CD-DA area 203 are alternately reproduced, the follow-up time for the rotating speed of the disc to reach one of the above-mentioned reproducing speeds is also required thus leading to delayed accessing. Although the follow-up time can be shortened to speed up the accessing, this shortened follow-up time leads to a further excess load imposed on the spindle motor.

For a spindle motor capable of coping with all of the above requirements, only a limited type of the spindle motor can be used, thus imposing designing limitations.

Also, the disc reproducing device reads out data from a disc responsive to a readout command from the host computer. However, in reproducing the above-mentioned combined disc, it is only one of the readout command for the CD-ROM area 202 and the readout command for the CD-DA area 203 that can accept the readout command from the host computer at a time, while the two commands cannot be accepted simultaneously. That is, if the CD-ROM area 202 and the CD-DA area 203 are reproduced alternately, and one of the readout command for the CD-ROM area 202 and the readout command for the CD-DA area 203 is received, the other of the readout command cannot be accepted nor executed until the received readout command is executed and has come to a close.

In view of the above-described status of the art, it is an object of the present invention to provide a disc reproducing device and method in which, when reproducing data that permits high-speed reproduction, such as CD-ROM data, and data to be inherently reproduced at a standard reproducing speed, such as CD-DA data, both data can be reproduced with short accessing time without unduly loading the spindle motor, in which the service life of the disc drive unit can be extended to reduce the size of the device and to diminish the power consumption and heat evolution, and in which the CD-ROM data and the CD-DA data can be read out in parallel.

DISCLOSURE OF THE INVENTION

The present invention provides a disc reproducing device for reproducing a disc-shaped recording medium having recorded thereon at least first data to be reproduced at a first reproducing rate and second data to be reproduced at a second reproducing rate faster than the first reproducing rate, the first data and the second data being recorded separately in plural areas. The disc reproducing device includes disc-shaped recording medium rotating driving means for rotationally driving the disc-shaped recording medium, rotating speed controlling means for controlling the disc-shaped recording medium rotating driving means so as to rotate at a rotational speed corresponding to at least the second reproducing rate, inputting means for inputting a readout command for the first data or the second data, accessing means for accessing the disc-shaped recording medium for reading out data recorded thereon, accessing means movement means for moving the accessing means to a desired position in the radial direction of the disc-shaped recording medium, controlling means for causing the movement means to move the accessing means based on the readout command for the first data or the second data from the inputting means for causing the accessing means to read out desired data on the disc-shaped recording medium, output data discriminating means for discriminating whether output data read out from the accessing means is the first data or the second data and for outputting the result of discrimination, buffer memory means for storing the first data and buffer memory controlling means for causing the output data at the second reproducing rate to be stored in the buffer memory means if, based on the results of judgment, the output data is the first data, the buffer memory controlling means causing the first data of the buffer memory means to be read out at the first reproducing rate. The buffer memory controlling means causes the first data of the buffer memory means to be read out at the first reproducing rate, while causing the accessing means to access the second data as desired based on the readout command for the second data from the input means for reading out the second data.

Preferably, the data discrimination information for discriminating whether the data recorded on the disc-shaped recording medium is the first data or the second data is recorded in a table information storage portion recorded on the innermost or the outermost area of the disc-shaped recording medium.

The disc reproducing device according to the present invention also includes occupying data volume monitoring means for monitoring whether the occupying data volume in the buffer memory means has reached a pre-set volume. The buffer memory controlling means causes writing of the first data in the buffer memory means to be halted when the occupying data volume has reached the pre-set volume. If the occupying data volume monitoring means detects that the occupying data volume in the buffer memory means has reached a second pre-set volume and the address is already written in the address information storage means, the buffer memory controlling means causes the first data of the address to be written in the buffer memory means.

The disc reproducing device according to the present invention also includes error correction means for correcting errors of the output data including error correction codes. The error correction means corrects the errors of the output data by utilizing the buffer memory means.

The first data handled by the disc reproducing device of the present invention is digital audio data generated on sampling analog audio signals.

The present invention also provides a disc reproducing method for reproducing a disc-shaped recording medium having recorded thereon at least first data to be reproduced at a first reproducing rate and second data to be reproduced at a second reproducing rate faster than the first reproducing rate, the first data and the second data being recorded separately in plural areas of the disc-shaped recording medium. The method includes a disc-shaped recording medium rotating step of rotating the disc-shaped recording medium at a rotating speed at least corresponding to the second reproducing rate, a command inputting step of inputting a readout command of reading out data on the disc-shaped recording medium, a first readout step of reading out data on the disc-shaped recording medium by readout means for outputting output data, a readout means movement step of moving the readout means along the radius of the disc-shaped recording medium for accessing a desired position on the disc-shaped recording medium, an output data discrimination step of discriminating whether the output data is the first data or the second data and outputting the result of decision, a storage step of storing the output data in buffer memory means at the second reproducing rate if the output data is the first data, based on the results of discrimination, a second readout step of reading out the first data of the buffer memory means at the first reproducing rate and a third readout step for causing the readout means to access the second data for reading put the second data if, when the first data of the buffer memory means is read out at the first reproducing rate, the readout means is not reading out the first data of the disc-shaped recording medium.

The disc reproducing method of the present invention also includes an occupying data volume monitoring step for monitoring whether the occupying data volume in the buffer memory means has reached a pre-set volume, a writing stop step of causing writing of the first data in the buffer memory means to be halted when the occupying data volume has reached the pre-set volume and an address information storage step of storing the address information of the first data not written in the buffer memory means because the occupying data volume has reached the first pre-set volume in the writing stop step.

The disc reproducing method of the present invention further includes a second occupying data volume monitoring step of monitoring whether the occupying data volume of the buffer memory means has reached a second pre-set volume, an address information readout step of reading out the address information when the occupying data volume has reached the second pre-set volume and a writing step of writing the first data in the buffer memory means.

In the disc reproducing method of the present invention, the disc discrimination information recorded in the table information storage portion of a lead-in area provided in the innermost or outermost rim portions of the disc-shaped recording medium for discriminating between the first data and the second data is compared to the readout command for obtaining the result of discrimination in the output data discrimination step.

The disc reproducing method of the present invention also includes an error correction step of correcting errors in the output data including the error correction code.

The disc reproducing method of the present invention also includes a holding step of jumping the readout means by −1 track along the radius of the disc-shaped recording medium for holding the readout means on a pre-set track.

BRIEF DESCRIPTION OF THE DRAWINGS

FIG. 13 illustrates three types of the format for the mode 1, mode 1 and the mode 2 of the CD-ROM area.

BEST MODE FOR CARRYING OUT THE INVENTION

Figure 1:
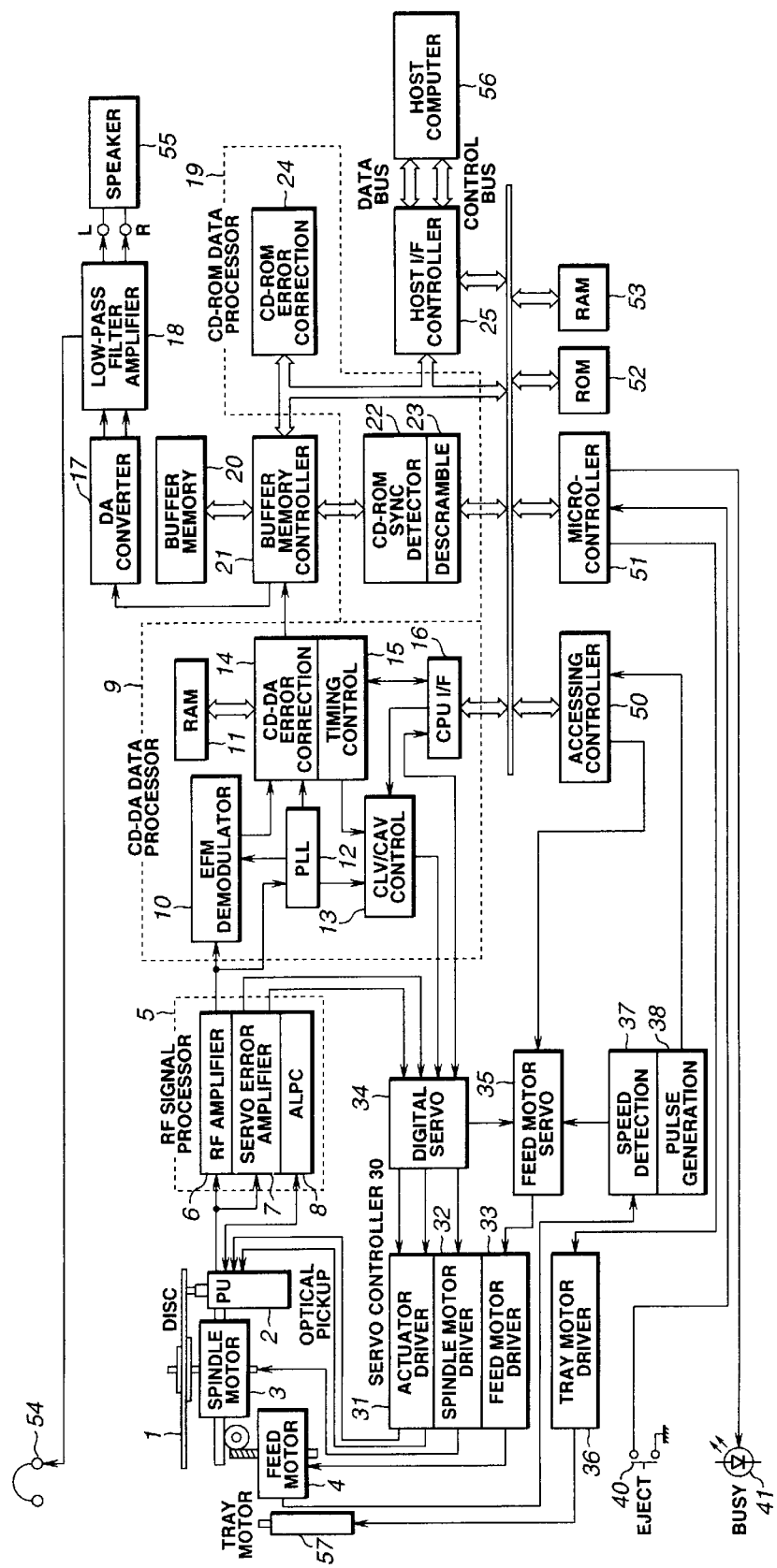
FIG. 1 is a block circuit diagram showing the structure of a disc reproducing device embodying the invention.

Referring to the drawings, preferred embodiments of the present invention will be explained in detail.

Figure 17:
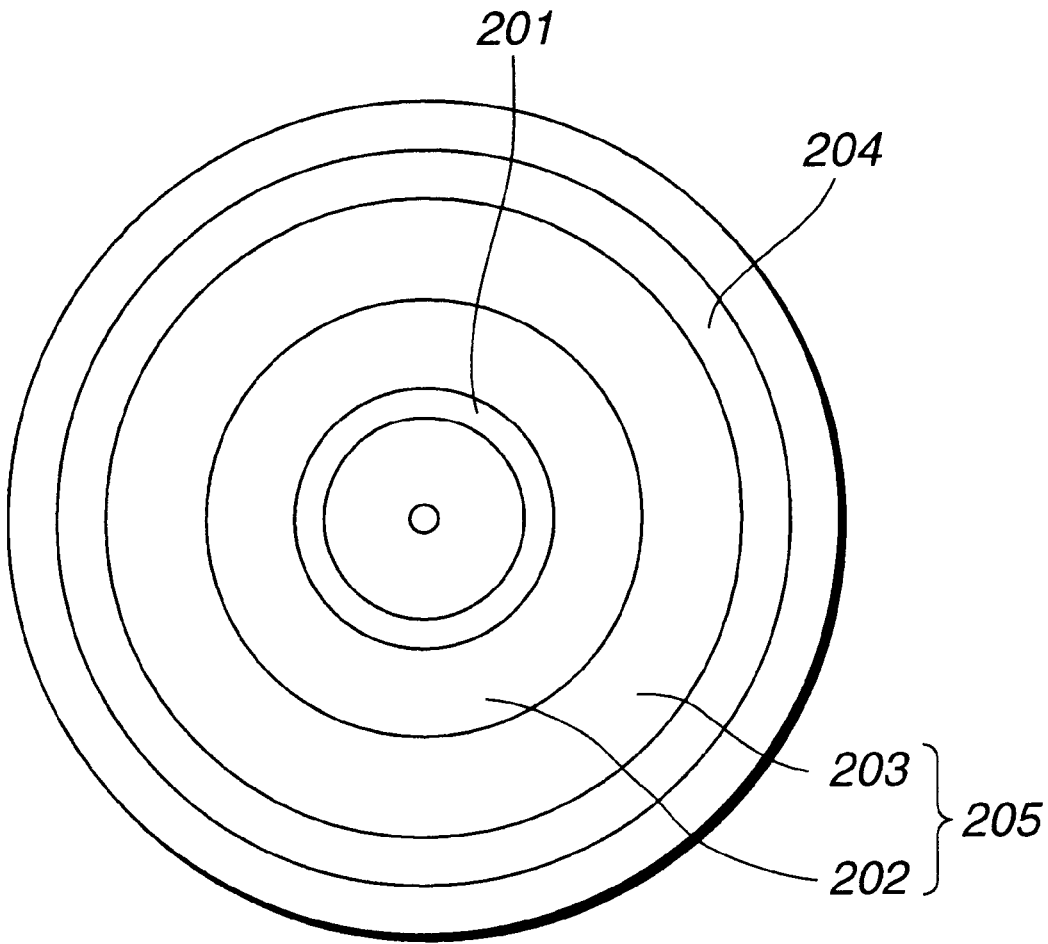
FIG. 17 illustrates a combined disc (mixed mode disc).

FIG. 1 shows the schematic structure of essential portions of a disc reproducing device as an embodiment for carrying out the disc reproducing method and device of the present invention. The disc reproducing device of the instant embodiment can reproduce not only the CD-DA disc or the CD-ROM disc but also a combined disc (or a mixed mode disc) in which a CD-DA area 203 for storage of the audio data of the CD-DA standard (CD-DA data or first data) and a CD-ROM area 202 for storage of CD-ROM data of the CD-ROM standard (second data) are arranged in one disc as shown in FIG. 17.

Referring to FIG. 1, the disc reproducing device includes a spindle motor 3 for rotating a disc 1 having recorded thereon the CD-DA data of the CD-DA standard and the CD-TOM data of the CD-ROM standard. The spindle motor 3 can rotate the disc 1 at a standard speed, a quadrupled speed, a sextupled speed, an octatupled speed, a 10-tupled speed or a higher speed. The disc reproducing device rotationally drives the disc 1 by the spindle motor 3 at a constant linear velocity (CLV) or a constant angular velocity (CAV) in order to enable the data to be read out at the CLV or CAV as desired.

The disc reproducing device includes an optical pickup 2 as a head portion for reproducing data from the disc 1. The optical pickup 2 includes an optical system having a laser light source, such as a laser diode, optical components, such as collimator lens, objective lens or a cylindrical lens and a photodetector having light receiving sections of a pre-set pattern. The optical pickup 2 also includes a biaxial actuator for driving the objective lens in the vertical direction, that is in the focusing direction and in the horizontal direction, that is in the tracking direction.

The optical pickup 2 collimates the laser light radiated from the laser diode by a collimator lens into a collimated light beam which then is transmitted through a polarizing beam splitter so as to be converged by the objective lens on the disc 1. The optical pickup 2 at this time moves the objective lens in the focusing direction for converging the laser light on a recording surface of the disc, while moving the objective lens in the tracking direction for setting the focal position on a track of the recording surface. The reflected light from the disc 1 is led via the objective lens to the polarizing beam splitter. The light has its light path bent by a polarizing surface of the polarizing beam splitter so as to be led to the photodetector via the cylindrical lens. The photodetector converts the light by photo-electric conversion into electrical signals for taking out the signals recorded on the disc 1.

The optical system of the optical pickup 2 may be unitarily formed as a camera structure comprised of a laser light source, an optical prism and a photodetector for eliminating the collimator lens of a unitary structure, polarizing beam splitter and the cylindrical lens. The optical system of this coupler structure reflects the laser light from the laser light source by the optical prism to permit the light to proceed to the objective lens. Also, the light reflected by the disc and proceeding through the objective lens is captured into the interior of the optical prism to fall on the first photodetector. The light reflected by the first photodetector is reflected by the inner surface of the prism to fall on the second photodetector.

An output signal of the photodetector of the optical pickup 2 is sent to an RF signal processor 5. This RF signal processor 5 is used to take out the reproducing RF signals, tracking error signals and the focusing error signals from the output signal of the optical pickup 2. Specifically, the RF signal processor 5 includes a RF amplifier 6 for waveform equalizing the reproducing RF signals supplied from the optical pickup 2, a servo error amplifier 7 and an automatic laser power control (ALPC) unit 8 for controlling an output of a semiconductor laser of the optical pickup 2. Th servo error amplifier 7 forms tracking error signals by one of a variety of tracking error detection techniques, such as a 3-spot method or a push-pull method, while forming focusing error signals by one of a variety of focusing error detection techniques, such as an astigmatic method.

An output signal of the RF amplifier 6 of the RF signal processor 5 is sent to a CD-DA data processor 9. This CD-DA data processor 9 has a phase-locked loop (PLL) unit 12 for extracting bit clocks from the waveform-equalized reproducing RF signals and an eight-to-fourteen demodulation (EFM) unit 10 for EFM demodulation of the RF signals based on the bit clocks. That is, since the signals recorded on the disc 1 are EFM-modulated signals, the EFM demodulation unit 10 processes the signals with demodulation as a counterpart operation of EFM.

The signals demodulated by the EFM unit 10 are corrected for errors by cross interleave Reed-Solomon code (CIRC) by a CD-DA error correction unit 14. That is, since CIRC error correction codes are appended to the demodulated signals, the CD-DA error correction unit 14 performs error correction processing using the error correction codes, that is the error correction decoding. Meanwhile, a random access memory (RAM) 11 is a working memory for performing error correction. A timing controller 15 extracts frame synchronization signals from the signals demodulated by the EFM demodulating unit 10, based on the bit clocks, for performing timing control, such as error correction.

The CD-DA data processor 9 also includes a CLV/CAV controller 13 for performing CLV control or CAV control based on the bit clocks and the frame synchronization signals and a CPUI/F unit 16 for interfacing with a central processing unit (CPU) such as a micro-controller 51 over a bus.

The micro-controller 51 collectively controls a series of operations of the driving system from the feed control of an optical pickup 2 accompanying data readout from the disc 1 to the transfer of the processed data to the host computer 56.

Output data of the CD-DA data processor 9 (output data of the CD-DA error correction unit 14) is transiently stored in a buffer memory 20 via a buffer memory controller 21 and subsequently read out therefrom so as to be sent to a DA converter (D/A converter) 17 or to a CD-ROM data processor 19. That is, if data reproduced from the disc 1 is the CD-DA data (16-bit audio data), it is sent to the D/A converter 17, whereas, if the data reproduced from the disc 1 is the CD-ROM data, it is sent to a CD-ROM data processor 19.

The decision as to if the data reproduced from the disc 1 is the CD-DA data or the CD-ROM data is given by the micro-controller 51 based on the TOC information (data decision information) pre-read from the so-called table of contents (TOC) which is the table information storage unit of the lead-in area of the disc 1.

That is, the TOC is the information specifying which data contents are recorded at which position (track) on the disc for how long period in terms of the absolute time. Thus, the micro-controller 51 of the disc reproducing device of the instant embodiment can judge whether the disc 1 is the CD-DA disc, CD-ROM disc or the combined disc, subject to storage of the TOC information reproduced from the disc 1. In particular, the micro-controller 51 can judge whether the data of the track currently reproduced is the above CD-ROM data or the CD-DA data, even if the disc 1 is a combined disc. In this manner, the disc reproducing device of the instant embodiment can perform processing adapted to the CD-ROM data or the CD-DA data. The signal format recorded on the disc 1 will b explained in detail subsequently.

The buffer memory 20 is a large-capacity memory that can store at least several to tens of seconds of data from the disc 1. By storing data in the large-capacity buffer memory 20, it becomes possible to procure restoration time in case of occurrence of a tracking error of the optical pickup 2 or to procure head movement time in case of head movement between the CD-DA area 203 and the CD-ROM area 202 of the disc 1. The manner in which head movement time in case of head movement between the CD-DA area 203 and the CD-ROM area 202 of the disc 1 is procured by controlling the data writing and data readout on or from the buffer memory 20 will be explained in detail subsequently.

The CD-DA data sent to the D/A converter 17 is converted into analog audio signals and divided into right (R) and left (L) channels so as to be outputted via low-pass filter amplifier 18 to a speaker 55 or to a headphone 54.

The CD-ROM data processor 19 includes a CD-ROM sync detector 22 for detecting a synchronization signal (a synchronization pattern of CD-ROM data) from output data of the CD-DA error correction unit 14, a descramble 23 for descrambling data from the CD-DA error correction unit 14 and a CD-ROM error correction unit 24 for detecting and correcting errors in the CD-ROM data.

The CD-ROM error correction unit 24 has the capability of P-code dual error correction/Q-code dual error correction by CIRC by two Red-Solomon codes P(26, 24) and Q(45, 43) and an error pointer supplied from the CD-DA data processor 9. It is also possible to use single error correction of the P and Q codes, without using the error pointer, for saving in the hardware cost. The CD-ROM error correction unit 24 also has the error correction function of the mode 2 form 1 sector, as later explained, for CD-ROM XA application.

Meanwhile, this CD-ROM data processor 19 of FIG. 1 uses the buffer memory 20 simultaneously as a working memory for performing error correction processing of the CD-ROM data. Similarly, the buffer memory 20 may also be used for performing the function as the working memory in the RAM 11 of the CD-DA data processor 9.

The CD-ROM data, processed by the CD-ROM data processor 19, is transiently stored in the buffer memory 20 by the buffer memory controller 21. The CD-ROM data, stored in the buffer memory 20, is read out on the basis of a data request command sent from the host computer 56 over a control bus so as to be subsequently outputted via a host I/F controller 25.

The host I/F controller 25 is an interface of ATAPI (At Attachment Packet Interface) or a SCSI (small computer system interface) for receiving a command from the host computer 56 and for supplying the command to the micro-controller 51. That is, the disc reproducing device of the instant embodiment can be operated by the command of SCSI or ATAPI from the host computer 56.

Meanwhile, the SCSI is standardized as the interface for peripheral equipments for a small-sized computer and includes SCSI-1 and SCSI-2. The SCSI-2 has two sorts of transfer modes, that is a transfer mode of setting the data transfer rate to a maximum value of 10 MB/s (FAST SCSI) and a transfer mode of expanding the data bus width (WIDE SCSI). In the CD-ROM drive, the SCSI-2 is the transfer rate specifications of the SCSI-1 base with the 1-byte width data bus. The SCSI bus phase uses a system automatically executed by the phase processor enclosed in the micro-controller 51. This suppresses interposition of the micro-controller 51 to a minimum to minimize the protocol overhead.

The ATAPI is an interface protocol standard for connecting the CD-ROM drive to the IDE (Integrated Device Electronics) interface. The STSPI command set and the command format inherit the CD-ROM device command of SCSI-2. Each command is of a 12-byte structure. These 12 bytes are transferred as a packet from the host computer 56 to a register in the CD-ROM drive, such as a working RAM 53 of the micro-controller 51 of FIG. 1. The IDE/ATAPI interface is a 16-bit data bus that can support a host transfer rate up to 13.3 MB/s.

The disc reproducing device of FIG. 1 also includes an accessing controller 50 for controlling accessing of the optical pickup 2 to the disc 1, a ROM 52 for storing program data of the micro-computer 51 and a RAM 53 for providing a working area, these components being interconnected over a bus.

The data reproducing device of the instant embodiment has a digital servo circuit 34 configured for performing focusing servo and tracking servo of the optical pickup 2 based on the focusing error signals and tracking error signals outputted by the RF signal processor 5, while performing spindle motor servo based on the accessing control signals supplied from an accessing controller 50 via CPUI/F unit 16 and a rotational speed control signal from the CLV/CAV controller 13.

The digital servo circuit 34 converts the focusing error signals and the tracking error signals from the servo error amplifier 7 of the RF signal processor 5 into digital data and generates focusing servo data and tracking servo data based on the digitized focusing servo data and tracking servo data. The digital servo circuit 34 also sends the tracking servo signals and the focusing servo signals, converted from the servo data into analog signals, to an actuator driver 31. The frequency response characteristics, offset or the tracking balance, as designing parameters of the servo system, are automatically adjusted to characteristics optimum for the loaded disc ands the reproducing speed.

The actuator driver 31 generates a driving voltage of driving the biaxial actuator of the optical pickup 2 in a direction along the radius of the disc (direction perpendicular to the track), based on the tracking servo signals, while generating a driving voltage of driving the biaxial actuator in the focusing direction (direction perpendicular to the disc surface), based on the focusing servo signals. That is, with the above-described focusing servo and tracking servo, the biaxial actuator of the optical pickup 2 is driving-controlled so that the error amounts of the focusing error signals and the tracking error signals will be reduced to zero.

On the other hand, the digital servo circuit 34 converts the disc rotational speed control signal into digital data and generates spindle motor servo data, based on these data, while sending the spindle motor servo signal, obtained on converting the servo data into analog data, to a spindle motor driver 32.

The spindle motor driver 32 generates a driving voltage of driving the spindle motor 3 based on a spindle motor signal, thus realizing spindle motor servo.

The digital servo circuit 34 also generates disc feed control data of moving the optical pickup 2 to the target position along the radius of the disc, based on control data supplied from the accessing controller 50 via CPUI/F unit 16, and sends the disc feed control data to a feed motor servo circuit 35 (sled motor servo circuit).

This feed motor servo circuit 35 actuates a feed motor driver 33 based on the rotational speed detection signal from a speed sensor 37 adapted for detecting the rotational speed of a feed motor 4, a disc feed control signal from the digital servo circuit 34 and access control data from the accessing controller 50. The feed motor driver 33 moves the optical pickup 2 along the sled rail in a direction along the radius of the disc 1. The speed sensor 37 counts detection pulse outputs from a position speed sensor employing a Hall device for the feed motor 4 for detecting the rotational speed of the feed motor 4, that is the movement speed and the position of the optical pickup 2. Meanwhile, the movement speed of the optical pickup 2 can also be detected by counting the number of times of track traversing of the light beam. The rough seek accuracy can be improved by using the speed sensor 37, while the acceleration and braking characteristics can be improved by feeding the speed components back to the feed motor servo system. The speed profile data set in the accessing controller 50 during rough seek is generated by the micro-controller 51 based on the recording linear velocity/track pitch of the loaded disc and target seek addresses.

The disc reproducing device has a disc tray for inserting or loading the disc 1 into the device or ejecting the disc. The disc tray is driven by a tray motor 57. This tray motor 57 is driven by a tray motor driver 36 controlled by the micro-controller 51. On detection of ON of an ejection button 40, the micro-controller 51 controls the tray motor driver 36 for ejecting the disc from the device.

If the micro-controller 51 is engrossed with the internal calculations such that it cannot accept the operation by the user or commands from the host computer 56, the micro-controller 51 is configured for lighting a LED 41 for advising the user of that effect.

If, in the present embodiment, the disc 1 is the CD-DA disc, the disc rotating signal control signal is the constant linear velocity control signal for reproducing the disc 1 at the above-mentioned standard reproducing velocity. If the disc 110 is the CD-DA disc, data demodulated and corrected for errors by the CD-DA processor 9 is the CD-DA standard audio data, such that the CD-DA data is converted by the D/A converter 17 into analog audio signals so as to be outputted via low-pass filter amplifier 18 to the speaker 55 or to the headphone 54.

On the other hand, if the disc 1 is the CD-ROM disc, the disc reproducing device of the instant embodiment reproduces the disc 1 of the CD-ROM standard with a double speed or the quadrupled speed at a constant angular velocity. Thus, if the disc is the CD-ROM disc, the disc rotating speed control signal is the constant angular velocity control signal of reproducing the disc 1 with the double reproducing velocity. If the disc 1 is the CD-ROM disc, the signal demodulated and corrected for errors by the CD-DA data processor 9 is sent to the CD-ROM data processor 19 as described previously. The signals decoded by the CD-ROM data processor 19 is sent via the host I/F controller 25 to a structure downstream of the data bus (host computer 56).

In the disc reproducing device of the instant embodiment, the disc 1 is reproduced with the double speed reproduction of the constant angular velocity, if the disc 1 is the above-mentioned combined disc, as when reproducing the CD-ROM disc. Therefore, the disc rotating speed control signal in case the disc 1 is the combined disc is similarly the multiple speed reproduction of the constant angular velocity as in the case of reproducing the CD-ROM disc. That is, in reproducing the disc 1 which is the above-mentioned combined disc in the disc reproducing device of the instant embodiment, the reproducing speed of the disc 1 is the multiple speed reproduction of the constant angular velocity not only if the CD-DA area 203 having the CD-DA data recorded therein is reproduced, but also if the CD-ROM area 202 having the CD-ROM data recorded therein and the CD-DA area 203 having the CD-DA data recorded therein are reproduced alternately.

This means that, even if the combined disc is reproduced, both data can be reproduced in a short access time without unduly loading the spindle motor 3 while the disc drive unit can be extended in service life to reduce the size of the device as well as power consumption.

In the disc reproducing device of the instant embodiment, the CD-DA area 203 on the disc 1, which is the combined disc, is reproduced with the same reproducing speed as when reproducing the CD-ROM area 202, that is the multiple reproducing speed with constant angular velocity. It is noted that the above CD-DA data has to be reproduced at a constant reproducing rate with a constant linear velocity corresponding to the standard reproducing speed of 1.2 m/s to 1.4 m/s. However, if the disc 1 which is the combined disc is reproduced with the multiple reproducing speed with constant angular velocity, the reproducing rate of the CD-DA data is a high reproducing rate which is in meeting with the multiple reproducing speed with constant angular velocity and which is varied with the prevailing reproducing position on the disc. This rate is hereinafter termed a variable high reproducing rate. If the CD-DA data read out at the multiple reproducing speed is outputted at the same data rate, the data is heard to the human ear as if the data were reproduced with fast feed.

Thus, in the disc reproducing device of the instant embodiment, if the data read out from the disc 1 which is the above-mentioned combined disc is the above-mentioned CD-DA data, the variable high reproducing rate CD-DA data in meeting with the multiple reproducing speed with constant angular velocity is rate-converted into the CD-DA data of the constant reproducing rate in meeting with the standard reproducing speed by storing the CD-DA data demodulated and corrected for errors in the buffer memory 20 via the buffer memory controller 21 and by controlling the readout rate of the buffer memory 20.

That is, in the disc reproducing device of the instant embodiment, the CD-DA data of the variable high reproducing rate in meeting with the multiple-speed reproduction is converted to the constant reproducing rate in meeting with the standard reproducing rate by providing the buffer memory 20 and by the micro-controller 51 causing the buffer memory controller 21 to perform such write and readout control in which the CD-DA data of the variable high reproducing rate in meeting with the multiple speed reproduction are sequentially stored in the buffer memory 20 and in which the data is sequentially read out from the buffer memory 20 at a constant reproducing rate in meeting with the above-mentioned standard reproducing speed. This conversion from the CD-DA data from the variable high reproducing rate to the standard reproducing rate will be explained subsequently in detail.

The CD-DA data of the constant reproducing rate (audio data), in meeting with the above-mentioned standard reproducing speed, obtained as described above, is converted by the D/A converter 17 to analog audio signals which are then outputted via low-pass filter amplifier 18. If, in the present embodiment of the disc reproducing device, the data read out from the disc 1 which is the above-mentioned combined disc and demodulated and corrected for errors by the CD-DA data processor 9 is the above-mentioned CD-ROM data, the data is processed in the same way as explained above by the circuitry downstream of the CD-ROM data processor 19.

Meanwhile, if the CD-DA data of the variable high reproducing rate in meeting with the multiple reproducing speed is stored in the buffer memory 20 and the CD-DA data stored in the buffer memory 20 is read out at a low constant reproducing rate in accordance with the above-mentioned standard reproducing speed, the buffer memory 20 will overflow sooner or later.

Thus, with the present embodiment of the disc reproducing device, the micro-controller 51 monitors the occupied memory volume of the buffer memory 20 via the buffer memory controller 21 in order to perform write and readout control of the buffer memory 20 based on the occupied memory volume and in order to perform data reproducing control from the disc 1.

That is, if, in the present embodiment of the disc reproducing device, the reproducing data from the disc 1 is the above-described CD-DA data, the CD-DA data is stored in the buffer memory 20. At this time, the buffer memory controller 21 detects the data volume stored in the buffer memory 20 and, if the occupied portion of the memory is increased such that the data storage volume reaches a pre-set volume, that is if the remaining memory capacity is well-nigh depleted, the buffer memory controller 21 advises the micro-controller 51 of that effect. Alternatively, the buffer memory controller 21 advises the micro-controller 51 of the result of detection of the stored volume.

On reception of the notice, the micro-controller 51 momentarily interrupts the data readout from the disc 1, while controlling the buffer memory controller 21 to stop writing of the CD-DA data in the buffer memory 20. That is, the micro-controller 51 controls the digital servo circuit 34 and the CD-DA data processor 9 to apply pause (transient stop) to reproduction of the disc 1. When the reproduction of the disc 1 is paused in this manner, the micro-controller 51 controls the digital servo circuit 34, actuator driver 31, spindle motor driver 32, feed motor driver 33 and the CD-DA data processor 9 for repeatedly reproducing the track having recorded thereon the CD-DA data at the time point of cessation of writing on the buffer memory 20.

Simultaneously, the micro-controller 51 controls the buffer memory controller 21 for outputting the CD-DA data stored in a pre-set amount on cessation of writing from the buffer memory 20 at a readout rate corresponding to the standard speed. If, as a result thereof, the data in the buffer memory 20 has deceased to a pre-set data volume, such that the memory capacity has recovered, the buffer memory controller 21 advises the micro-controller 51 of that effect.

On reception of a notice that the memory capacity has recovered, the micro-controller 51 cancels the reproducing pause of the disc 1 to re-initiate reproduction of the CD-DA data from the disc 1 so that the CD-DA data now reproduced will connect to the CD-DA data at the write stop time point to the buffer memory 20, that is CD-DA data reproduction will be re-initiated as from the position of interruption of reproduction of the disc 1. Simultaneously, writing of the CD-DA data in the buffer memory 20 is re-initiated.

Figure 2:
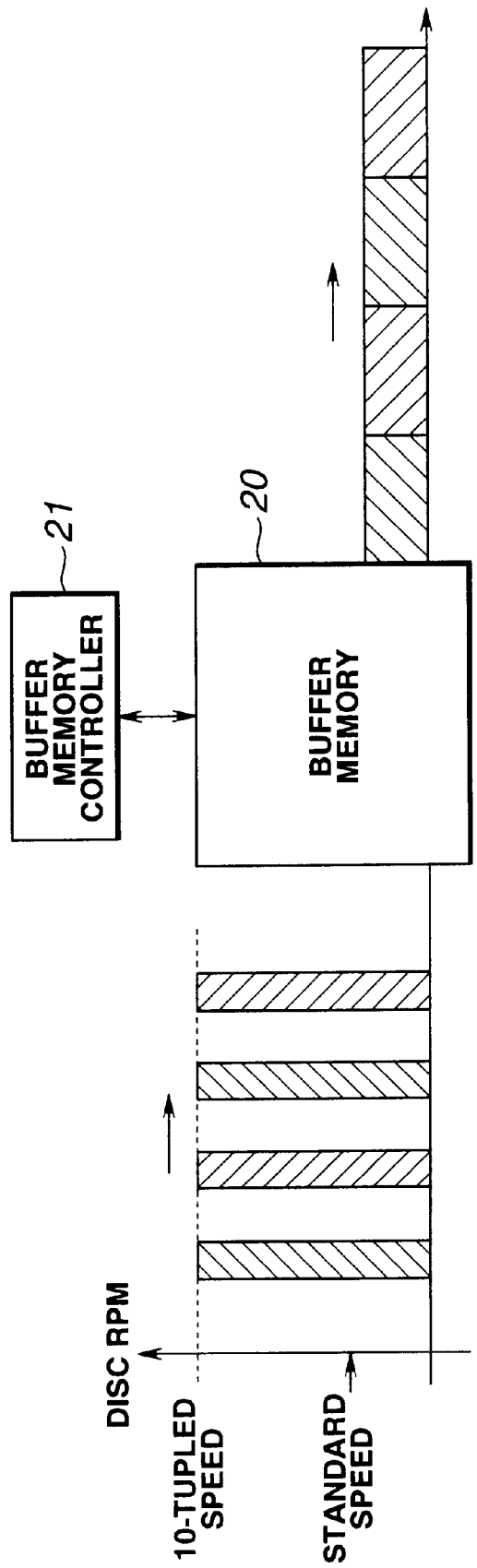
FIG. 2 illustrates the concept of readout of CD-DA data during 10-tupled speed readout.

That is, the data reproducing device stores the CD-DA data, intermittently read out from the disc 1 at a multiple speed (at a 10-tupled speed in the example of FIG. 2) at a pre-set interruption time interval, in the buffer memory 20, while outputting the stored CD-DA data from the buffer memory 20 at the standard speed data rate, for enabling the outputting of the continuous reproducing speed similar to that read out at the standard speed and prevention of overflow of the buffer memory 20.

The disc reproducing device at this time detects the position of re-initiating readout of the disc 1, based on the subcode information appended to each block of the CD-DA data, as will be explained subsequently with reference to FIGS. 11 and 12. When interrupting reproduction of the disc 1, the disc reproducing device causes the subcode information to be stored in a RAM 53 so that, on re-initiation of reproduction, the disc reproducing device detects the read-out re-initiation position based on the stored subcode information.

If the data reproduced from the disc 1 is the CD-ROM data, the micro-controller 51 causes the CD-ROM data to be stored in the buffer memory via the buffer memory controller 21. The readout rate from the buffer memory 20 corresponds to the 10-tupled speed. That is, continues CD-ROM data of the multiple-speed (10-tupled speed in the previous embodiment) is read out from the disc 1, instead of being read out intermittently as in the case of the CD-DA data in FIG. 2, such that the CD-ROM data of the 10-tupled rate is stored in the buffer memory 20. When the data is read out from the buffer memory 20, the CD-ROM data is read out from the buffer memory 20 at a readout rate in meeting with the multiple rate, such as 10-tupled rate. Thus, the CD-ROM data processor 19 processes the CD-ROM data of a rate corresponding to the multiple rate reproduction. If the data id the CD-ROM data, the readout rate from the buffer memory 20 can be set so as to be a constant high data rate different from the writing rate.

When reading out the CD-DA data or the CD-ROM data from the disc 1, a command as to which of these data is read out is issued by the host computer 56 responsive to the user input. That is, the host computer 56 is responsive to the user command input to advise the micro-controller 51 of a readout command corresponding to the type of data read out from the disc 1, that is a command conforming to the SCSI or to the ATAPI format. The micro-controller 51 is responsive to the readout command to read out the CD-DA data or the CD-ROM data from the disc 1.

Figure 3:
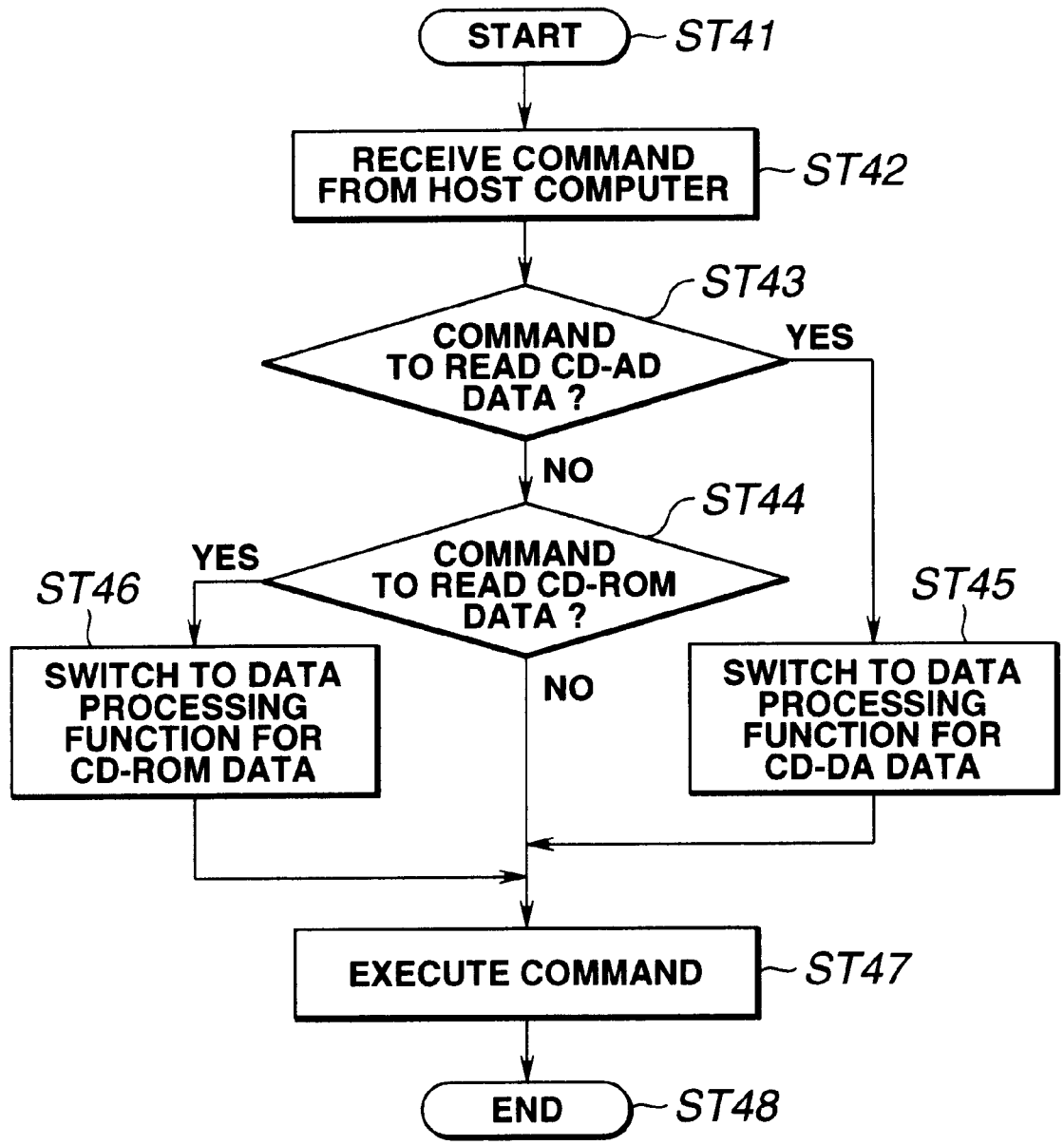
FIG. 3 is a flowchart for illustrating essential portions of the disc reproducing device embodying the invention.

The sequence of operations in the disc reproducing device responsive to this data readout command from the host computer 56 is explained with reference to FIG. 3.

In this figure, the disc reproducing device starts processing at step ST41 to receive at ST42 a command sent from the host computer 56. Specifically, the command is communicated from the host computer 56 to the micro-controller 51.

The disc reproducing device judges at step ST43 whether or not the command is a readout command for reading out the CD-DA data (audio data) from the CD-DA area 203 of the disc 1. If the command is the readout command fro reading out the CD-DA data, processing transfers to step ST45.

If the command is judged at step ST43 that the command is the readout command for reading out the CD-DA data, the disc reproducing device at step ST45 switches the function of the disc reproducing device for executing only the data processing function by the CD-DA data processor 9. Specifically, the micro-controller 51 advises the CD-ROM data processor 19 of the fact that the reproducing data from the disc 1 is not the CD-ROM data but is the CD-DA data. Thus, the data processing by the CD-ROM data processor 19 is not carried out.

The disc reproducing device then executes at step ST47 the processing in meeting with the above-mentioned readout command. Specifically, the disc reproducing device causes a pre-set amount of the CD-DA data processed by the CD-DA data processor 9 to be stored in the buffer memory 20, under control by the buffer memory controller 21, while converting the data rate for the stored CD-DA data to a data rate similar to the standard speed and reading out the CD-DA data at this converted data rate from the buffer memory 20 to send the read-out data to the D/A converter 17.

If at step ST43 the above command has been found to be not the data rate for reading out the CD-DA data, processing transfers to step ST44. The disc reproducing device judges at step ST44 whether or not the above command is the readout command for reading out the CD-ROM data from the disc 1. If the command is the readout command for reading out the CD-ROM data, processing transfers to step ST46.

If the command is found at step ST44 to be the readout command for reading out the CD-ROM data, the disc reproducing device switches the function of the disc reproducing device for executing both the data processing function by the CD-DA data processor 9 and that by the CD-ROM data processor 19. Specifically, the micro-controller 51 advises the CD-ROM data processor 19 of the fact that the reproducing data from the disc 1 is the CD-ROM data. Thus. The CD-ROM data processing is carried out by the CD-ROM data processor 19.

The disc reproducing device then executes at step ST47 the processing in meeting with the above-mentioned readout command. Specifically, the disc reproducing device causes a pre-set amount of the CD-ROM data processed by the CD-DA data processor 9 to be stored in the buffer memory 20 under control by the buffer memory controller 21, while converting the data rate of the stored CD-ROM data to a constant data rate in meeting with the multiple speed reproduction and reading out the converted CD-ROM data from the buffer memory 20 to send the data to the CD-ROM data processor 19. The CD-ROM data processor performs the above-mentioned data processing on the CD-ROM data to send the processed data via host I/F controller 25 to the host computer 56. Alternatively, the CD-ROM data processor 19 causes the data to be re-stored in the buffer memory 20 to read out the data therefrom to send the read-out data via the host I/F controller 25 to the host computer 56.

If the command is found at steps ST43 and ST44 to be not the command for reading out the CD-DA data and the CD-ROM data, processing directly transfers to step ST47 to execute the command. Specifically, the command may be a command for detecting the state of the disc 1, a command for detecting the state of the disc 1 from the disc reproducing device or a command sent from the disc reproducing device at the time of ejecting the disc 1.

The processing by the disc reproducing device comes to a close at step ST48.

In the disc reproducing device of the instant embodiment, the disc 1 is controlled to be run in rotation at e.g., a 10-tupled speed at a constant angular velocity. The data read out from the disc 1 is processed by the CD-DA data processor 9 so as to be transiently stored in the buffer memory 20 under control by the buffer memory controller 21.

If the reproducing data is the CD-DA data, the data is read out intermittently. That is, if the reproducing data is found by the micro-controller 51 to be the CD-DA data, the data processed by the CD-DA data processor 9 is stored in the buffer memory 20 up to a pre-set data volume. The data readout from the disc 1 is interrupted at the same time as the pre-set volume of the CD-DA data is stored in the buffer memory 20. The stored CD-DA data is read out from the buffer memory 20 so as to be outputted without gaps. If, as a result of this outputting of the CD-DA data, the stored CD-DA data in the buffer memory 20 is decreased to a pre-set volume, readout of the CD-DA data from the disc 1 is re-initiated from the interrupted point. The CD-DA data also has its data rate converted to a standard data rate when sent out from the buffer memory 20. In this manner, the CD-DA data is outputted from the speaker 55 in the same speech state as when it is read out form the disc 1 rotated at the standard speed. Thus, the present embodiment of the disc reproducing device can output the CD-DA data as the speech output comparable to the CD-DA data read out at the standard speed without lowering the rotational speed of the combined disc 1.

Since the disc reproducing device can read out data without lowering the rotational speed of the disc 1, the torque of the spindle motor 3 can be set to a smaller value thus enabling the spindle motor 3 and hence the entire device to be reduced in size. Moreover, it is unnecessary with the disc reproducing device to accelerate or decelerate the rotational seed of the disc 1 for the multiple speed, such as the 10-tupled speed, or the standard speed, thus reducing the power consumption of the spindle motor 3 and the device itself. In addition, since the power consumption of the spindle motor 3 is reduced, the amount of hear evolved in proportion to the power consumption can be reduced. By this size reduction and reduction in power consumption and hear evolution, the disc reproducing device can be applied to a battery-driven portable terminal. Since the acceleration or deceleration of the disc 1 is unnecessary for the multiple speed and the standard speed of the disc 1, there is no necessity to provide a waiting time required in the conventional device to refrain from data readout to await the stabilization of the rotating speed of the disc, thus enabling reduction in the accessing time. Since both the CD-DA data and the CD-ROM data can be read out with the multiple speed, the structure used conventionally for the standard speed may be dispensed with to simplify the structure of the device and to reduce the substrate surface measure. Since the magnitude of the torque hitherto required of the spindle motor 3 can be set to a lower value, the degree of freedom in designing can be improved. In the disc reproducing device in which data is usually read out from the disc 1, a working RAM is conventionally provided for doing error correction of the CD-DA data or the CD-ROM data. By adding these RAMs in the buffer memory 20, the above-mentioned functions may be implemented without adding complex structures. Specifically, the above-mentioned functions may be realized by switching the data processing sequences depending on whether the reproducing data of the disc 1 is the CD-DA data or the CD-ROM data.

The above-described embodiment is directed to a disc reproducing device in which CD-DA data is read out intermittently from the disc 1 responsive to the amount of stored data in the buffer memory 20. The present invention is not limited thereto and may be configured so that a combined disc is used and the CD-ROM data of the CD-ROM area 202 is read out during the time since interruption until re-initiation of readout of the CD-DA data of the CD-DA area 203. This enables the CD-DA data and the CD-ROM data to be time-divisionally read out without awaiting the end of reproduction of the CD-DA data such that the CD-ROM data can be accessed as the CD-DA data is reproduced. Stated differently, the readout command for the CD-DA command and that for the CD-ROM data can be accepted in parallel for execution time-divisionally.

Figure 4:
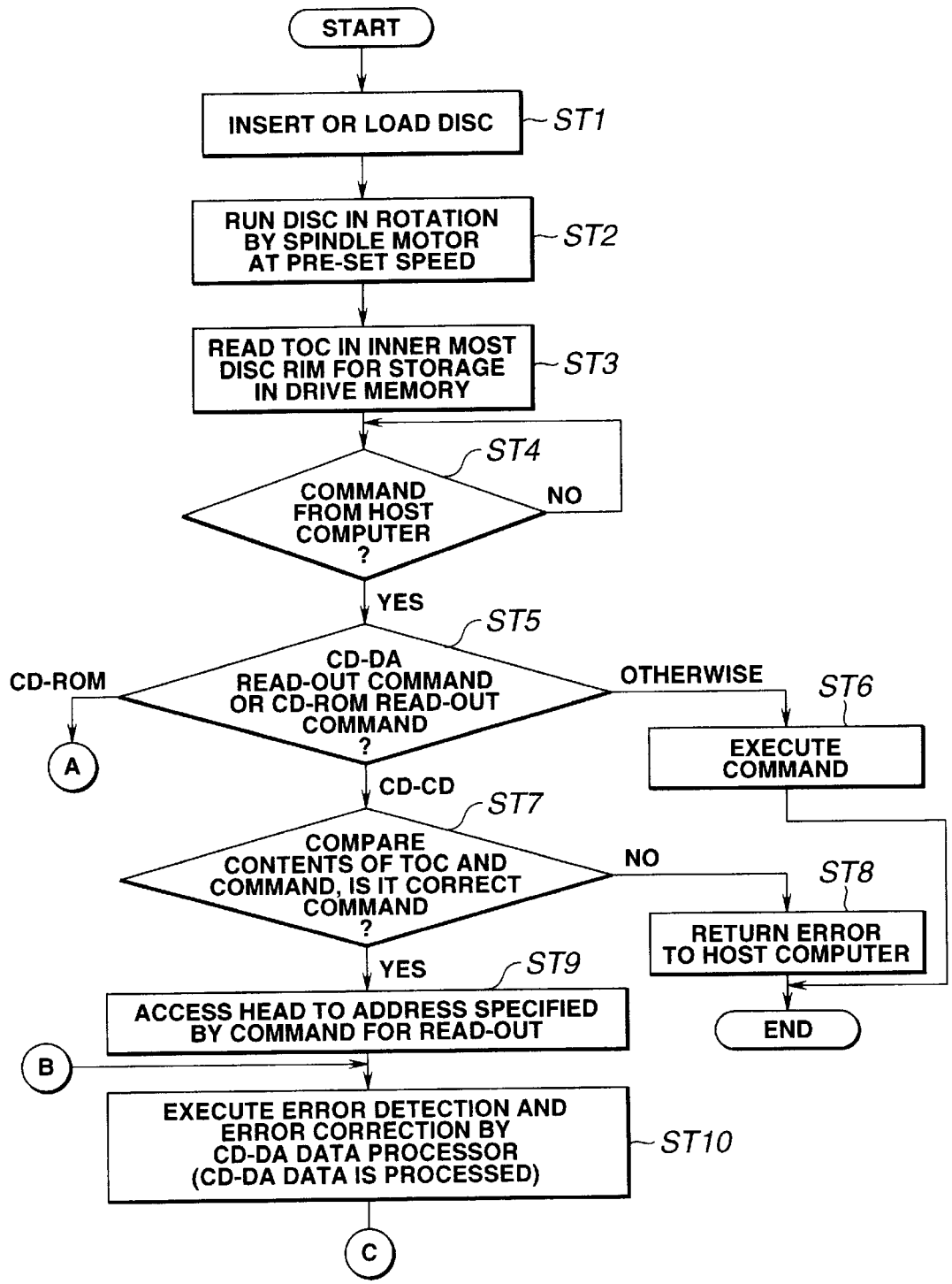
FIG. 4 is flowchart for illustrating the flow from disc insertion until error correction of the CD-DA data and CD-ROM data in the disc reproducing device embodying the invention.
Figure 5:
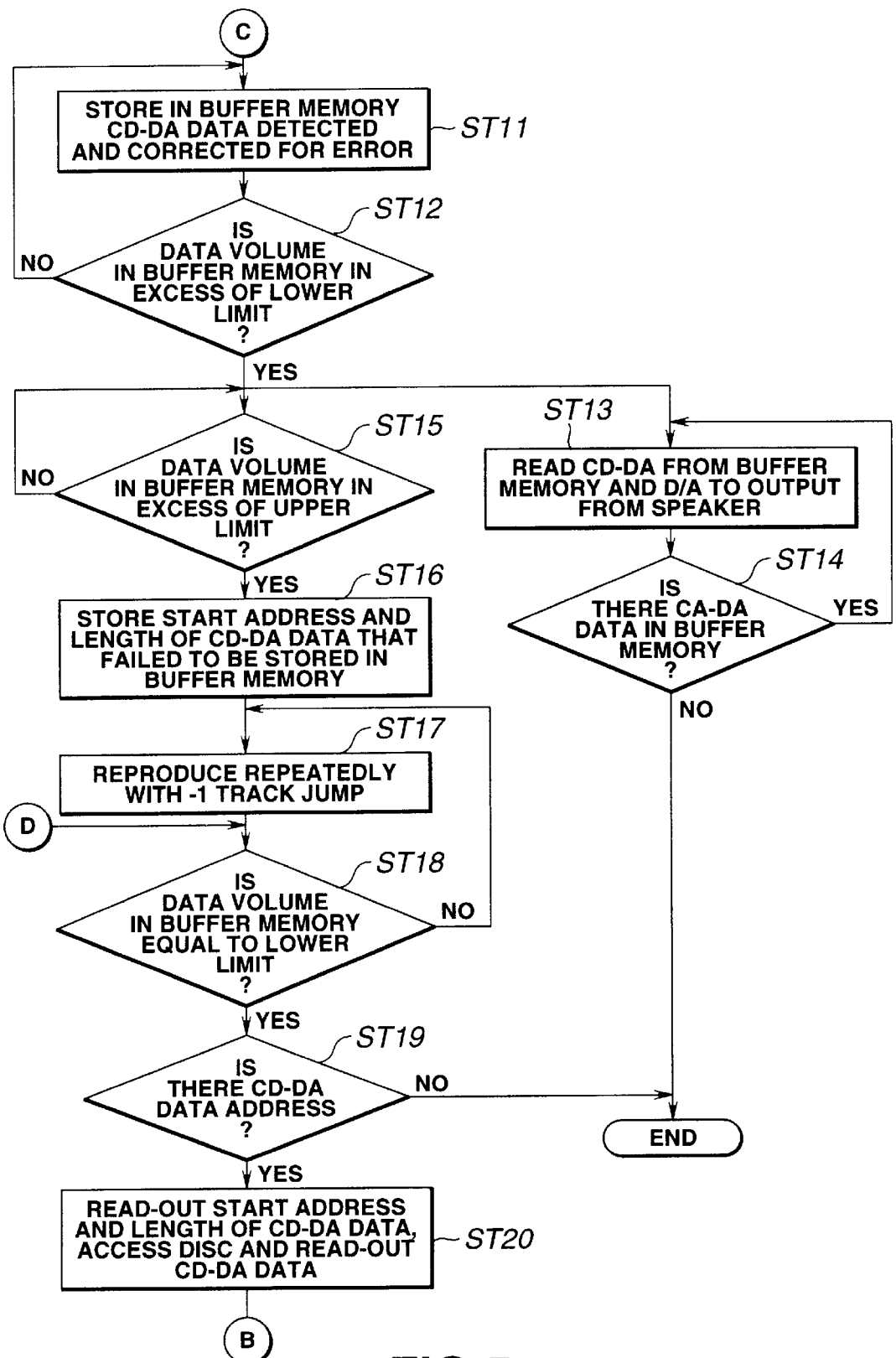
FIG. 5 is a flowchart for illustrating the flow of essential portions of storage and readout of CD-DA data to or from a buffer memory when the CD-DA data and the CD-ROM data are time-divisionally read out in the disc reproducing device embodying the invention.
Figure 6:
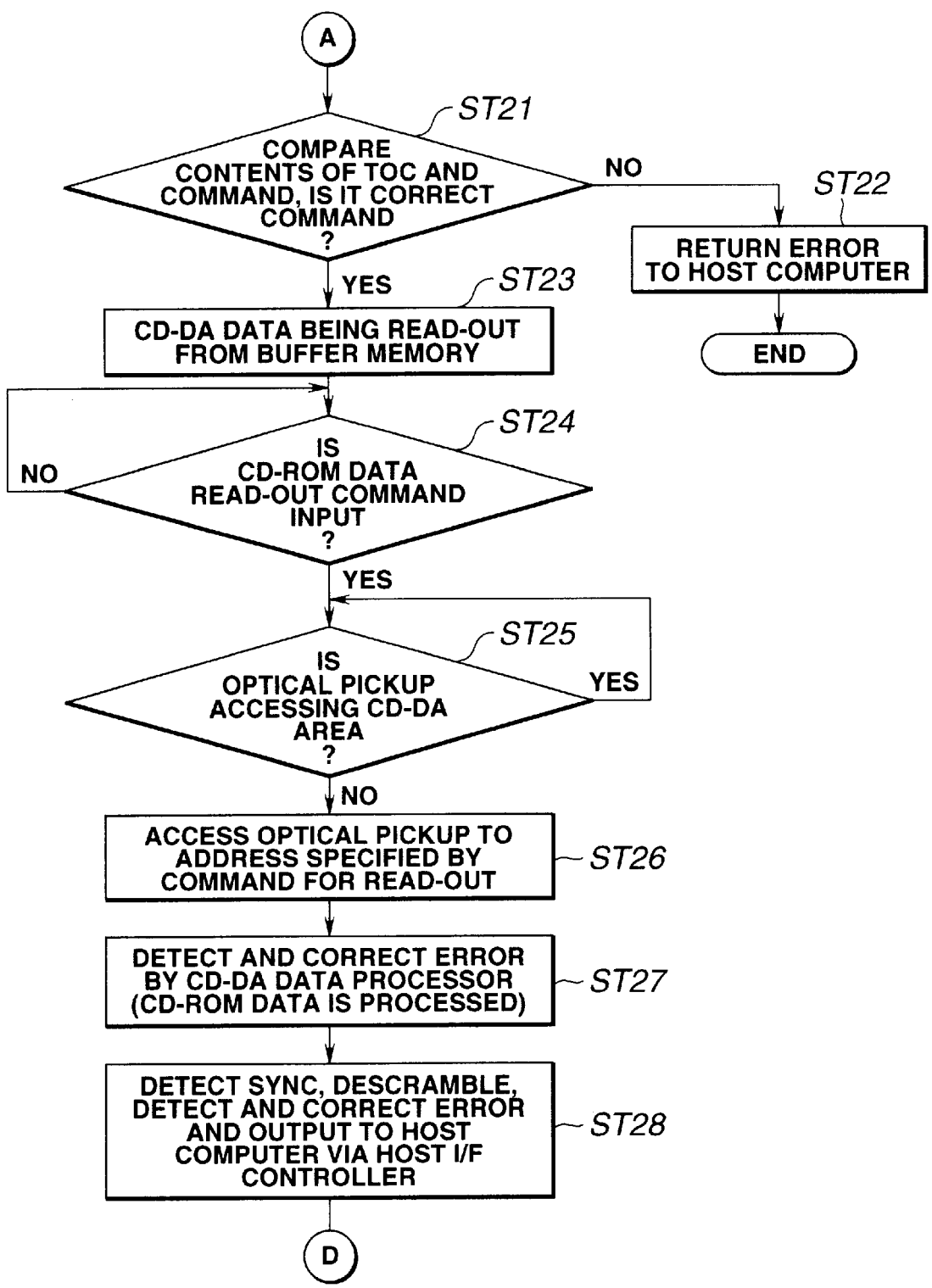
FIG. 6 is a flowchart for illustrating the flow of essential portions from acceptance of command of CD-ROM data until outputting to a host computer when the CD-DA data and the CD-ROM data are time-divisionally read out in the disc reproducing device embodying the invention.

The processing procedure in the disc reproducing device of the instant embodiment in time-divisionally reading out the CD-DA data and the CD-ROM data is now explained by referring to the flowcharts of FIGS. 4 to 6.

In FIG. 4, the disc 1 is inserted or loaded at step ST1 from the disc tray on the disc reproducing device of the instant embodiment. If the disc 1 is inserted or loaded in the instant embodiment of the disc reproducing device, the spindle motor 3 starts to be rotated at a pre-set speed. If, by the rotation of the spindle motor 3, the disc 1 has reached the above-mentioned pre-set speed where it is stabilized, the TOC information recorded in a lead-in area 201 in the radially innermost portion of the disc 1 is read out at step ST3 and stored in a drive memory, that is in a RAM 53 or the buffer memory 20 used by the micro-controller 51. The rotating disc speed during readout of the TOC information may be the rotating speed corresponding to the above-mentioned 10-tupled speed or the standard speed. If the TOC data is read out at the standard speed, readout speed transfers to the high speed, such as the 10-tupled speed, after the end of the readout of the TOC information.

The micro-controller 51 of the disc reproducing device judges at step ST4 whether or not the command has been supplied from the host computer 56. This judgment is repeated until the command is supplied. If, at the time of judgment at this step ST4, the command is supplied from the host computer 56, processing transfers to step ST5.

The micro-controller 51 judges, at step ST5, whether the command supplied from the host computer 56 is the CD-DA readout command instructing reproduction of the CD-DA data of the CD-DA area 203 or the CD-ROM readout command instructing reproduction of the CD-ROM data of the CD-ROM area 202 or any other command. If at step ST5 the command has been judged to be the CD-DA readout command, processing transfers to step ST7. If the command has been judged to be the CD-ROM readout command, processing transfers to step ST21 of FIG. 6 and, if the command has been judged to be any other command, processing transfers to step ST6.

At step ST6, the command is executed and subsequently the processing is terminated, as at step ST47 carried out in case the above command is found at step ST44 of FIG. 3 not to be the command for reading out the CD-DA data or the CD-ROM data. Specifically, the processing such as detection of the state of the disc 1 from the disc reproducing device or the processing of ejecting the disc 1 from the disc reproducing device is carried out.

It the command is judged at step ST5 to be the CD-DA readout command, the micro-controller 51 at step ST7 compares the contents of the TOC information (data judgment information) to the contents of the readout command in order to judge whether or not the command supplied from the host computer 56 is the correct readout command. For example, supposing that the above-mentioned readout command indicates reproduction of a given track (such as a musical number) in the CD-DA area 203, the micro-controller 51 judges, based on the TOC information, whether or not the track specified by the host computer 56 really exists in the CD-DA area 203. If the result of judgment is NO, processing transfers to step ST8 and, if otherwise, to step ST9. If the result of judgment at step ST7 is NO, the micro-controller 51 at step ST8 returns to the host computer 56 an error command indicating that the command is not correct, before the micro-controller 51 terminates the processing.

If the result of judgment at step ST7 is YES, the micro-controller 51 at step ST9 causes the readout head, that is the optical pickup 2, to access the address specified by the readout command via accessing controller 50. The micro-controller 51 then proceeds to step ST10.

The disc reproducing device at step ST10 sends the CD-DA data reproduced form the disc 1 to the CD-DA data processor 9 to execute the processing such as error detection and correction of the CD-DA data, as described above. After the end of processing of step ST10, the micro-controller 51 proceeds to step ST11 of FIG. 5.

Referring to FIG. 5, the micro-controller 51 at step ST11 controls the buffer memory controller 21 to cause the CD-DA data processed by the CD-DA data processor 9 to be stored in the buffer memory 20.

The micro-controller 51 at step ST12 monitors the buffer memory controller 21 to judge whether or not the data volume in the buffer memory exceeds a lower value (second pre-set amount). If the data volume exceeds the lower limit value, the micro-controller 51 transfers to the processing of step ST13 and the processing of step ST15.

The micro-controller 51 at step ST13 controls the buffer memory controller 21 to read out the CD-DA data from the buffer memory 20. The CD-DA data, read out from the buffer memory 20, is converted by the D/A converter 17 into analog audio signals which are outputted at the speaker 55.

The micro-controller 51 then judges whether or not CD-DA data is left in the buffer memory 20, via buffer memory controller 21. If the result of judgment is YES, processing reverts to step ST13 and, if otherwise, processing is terminated.

If the data volume in the buffer memory at step ST12 exceeds the lower limit value, the micro-controller 51 at step ST15 monitors the buffer memory controller 21 in order to judge whether or not the data volume in the buffer memory has exceeded the upper limit value (first pre-set value). If the data volume has not exceeded the upper limit value, the judgment of step ST15 is repeated and, if otherwise, processing transfers to step ST16.

If the data volume in the buffer memory 20 exceeds the upper limit value, the micro-controller 51 at step ST16 receives from the buffer memory controller 21 the information on the start address and the length of the CD-DA data not stored in the buffer memory 20 and holds the received information.

The micro-controller 51 simultaneously controls the digital servo circuit 34 to cause the optical pickup 2 to execute repeated reproduction, at the same time as the optical pickup 2 makes −1 track jump on the disc 1. During this time, the micro-controller 51 controls the buffer memory controller 21 to cause the CD-DA data to be continuously read out from the buffer memory 20. By continued data readout from the buffer memory 20 in the repeated reproduction-pause state, the store data in the buffer memory 20 can be reduced.

The micro-controller 51 at step ST18 judges, via buffer memory controller 21, whether or not the stored data volume in the buffer memory 20 has reached the lower limit value. If the result of judgment at step ST18 is NO, the micro-controller 51 reverts to step ST17. If the lower limit value is reached, the micro-controller 51 at step ST19 judges whether or not there are any residual addresses of the CD-DA data to be reproduced. If the result of judgment is NO, processing is terminated and, if otherwise, processing transfers to step ST20.

The micro-controller 51 at step ST20 controls the digital servo circuit 34 and the accessing controller 50, based on the information on the start address and length of the previously held CD-DA data to read out CD-DA data to be reproduced from the disc 1. After this processing at step ST20, processing reverts to step ST10 of FIG. 4.

If, at step ST5 of FIG. 4, the micro-controller 51 judges that the command supplied from the host computer 56 is the CD-ROM readout command instructing the reproduction of the CD-ROM data from the CD-ROM area 202 of the disc 1, the micro-controller 51 compares the contents of the TOC information (data discrimination information) to the contents of the readout command in order to judge whether or not the command supplied from the host computer 56 is the correct readout command. If, for example, the readout command indicates the reproduction of a track in the CD-ROM area 202, the micro-controller 51 judges, based on the TOC information, whether or not the track specified by the host computer 56 is really present in the CD-ROM area 202. If the result of judgment is NO, processing transfers to step ST22 and, if other wise, to step ST23. If the result of judgment at step ST21 is NO, the micro-controller 51 at step ST22 returns an error command indicating the incorrect command to the host computer 56 to terminate the processing.

If the result of judgment at step ST21 is YES, the micro-controller 51 at step ST23 confirms that the CD-DA data is being read out from the buffer memory 20, and then judges whether or not a readout command of the CD-ROM data has been entered from the host computer 56. If it is found at step ST24 that there is no CD-ROM readout command, the decision processing of step ST24 is repeated and, if otherwise, processing transfers to step ST25.

The micro-controller 51 at step ST25 judges whether or not the optical pickup 2 is accessing to the CD-DA area 203 of the disc 1 via the accessing controller 50. If the result of judgment is YES, the micro-controller 51 repeats the decision processing of step ST25 and, if otherwise, to step ST26.

The micro-controller 51 at step ST26 causes the optical pickup 2 to access the address of the disc 1 indicated by the readout command via the accessing controller 50 to read out the data.

The micro-controller 51 at step ST27 sends the CD-ROM data reproduced from the disc 1 to the CD-DA data processor 9 to perform processing such as error detection and correction of the CD-ROM data. After the processing of step ST27, the CD-ROM data outputted by the CD-DA data processor 9 is sent to the CD-ROM data processor 19 to perform the processing of step ST28.

That is, the CD-ROM data processor 19 at step ST28 performs processing, such as synchronization detection, descrambling, error detection and error correction, on the supplied CD-ROM data, as described above, and subsequently outputs the processed CD-ROM data via host I/F controller 25 to the host computer 56.

After the processing of step ST28, processing reverts to step ST18 of FIG. 5.

The processing of the flowcharts of FIGS. 4 to 6 implements time-divisional readout processing of the CD-DA data and the CD-ROM data in the instant embodiment of the reproducing device.

The disc 1 used n the disc reproducing device of the instant embodiment is explained in detail.

Referring to FIG. 17, the disc 1 is a combined disc including the CD-DA area 203 and the CD-ROM area 202 arrayed separately from each other. The CD-DA area 203 has the audio data of the CD-DA standard (CD-DA data) recorded on the track basis, whilst the CD-ROM area 202 has the CD-ROM data of the CD-ROM standard similarly recorded on the track basis.

Figure 7:
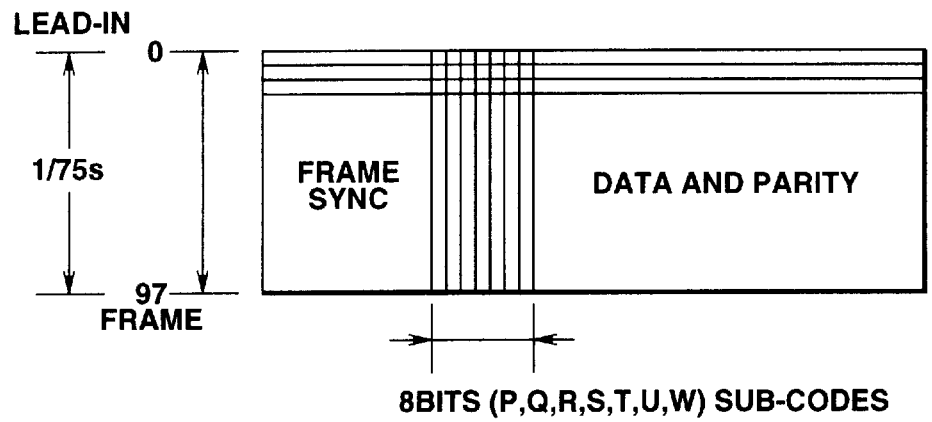
FIG. 7 illustrates a format of one block (sector) of the lead-in area.
Figure 8:
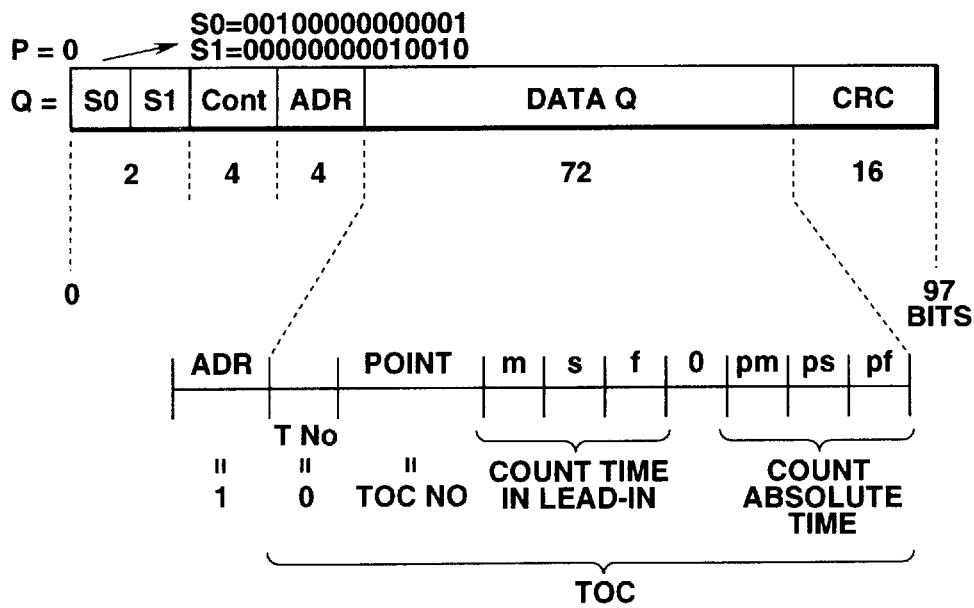
FIG. 8 illustrates a format of a sub-code of the lead-in area.

Each block (sector) of the lead-in area 201 of the disc 1 has 98 frames each having frame synchronization, 8 bits of the subcode and the data with parity, as shown in FIG. 7. The subcode of the lead-in area 201 is made up of a synchronization pattern portion of 2 bits of S0 and S1, a control portion (Cont) of 4 bits, an address portion of 4 bits (ADR), a data Q portion of 72 bits and a CRC parity portion of 16 bits, as shown in FIG. 8. The time count information and the absolute time count information in the lead-in area are arrayed in the data Q portion. The 72-bit data Q portion of the subcode of the lead-in area 201 is termed the table of contents (TOC) whereby the CD-DA data and the CD-ROM data can be discriminated from each other, as explained previously.

Figures 9, 10:
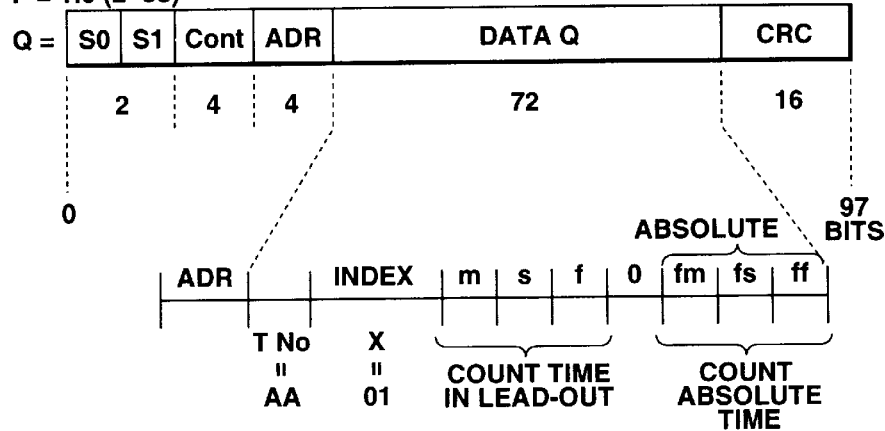
FIG. 9 illustrates the format of a TOC.
FIG. 10 illustrates the format of one block of a lead-out area.

FIG. 9 shows the format of the TOC. That is, the TOC is made up of a track number (TNo) of 8 bits in binary coded decimal (BCD) notation, a point (POINT) of 8 bits in BCD notation, elapsed time in the track, comprised of minutes (MIN or m) of 8 bits, seconds (SEC or s) and frame number (FRAME or f) each being of 8 bits in BCD notation, and the absolute time of the contents of the point comprised of 8 bits of 0 (zero), and each 8 bits of the minute (PMIN or pm), seconds (PSEC or ps) and frame numbers (PFRAME or pf) in the BCD notation. As for the point contents, if the point is from 00 to 99, it denotes the absolute time of beginning of each track represented by the numerical figure. If the point is A0, the minute (PMIN) denotes the first track number and the second (PSEC) denotes the frame number (PFRAME)=0, whereas, if the point is A1, the minute (PMIN) denotes the last track number and the second (PSEC) denotes the frame number (PFRAME)=0. If the point is A12, the minute (PMIN), second (PSEC) and the frame number (PFRAME) denote the absolute time of beginning of lead-out. The above series of contents of the TOC are repeated thrice.

Each block of a lead-out area 204 is basically the same as the lead-in area 201. However, the TOC differs from the TOC of FIGS. 8 and 9 in that the track number of FIGS. 8 and 9 is TNo=AA in the BCD notation, the point portion of FIGS. 8 and 9 become the index (X=01), the time count information in the lead-in of FIGS. 8 and 9 becomes the time count information in the lead-out and the absolute time of the contents of the point of FIGS. 8 and 9 becomes the absolute time (minute (fm), second (fs) and frame number (ff)) from the first track.

Figure 11:
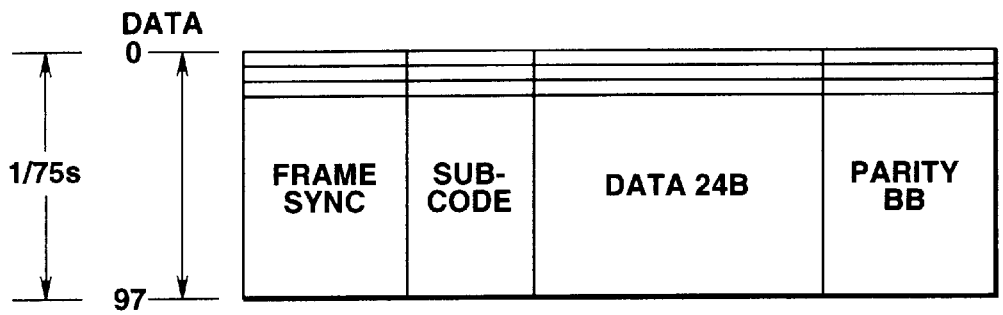
FIG. 11 illustrates the format of one block of the lead-out area.
Figure 12:
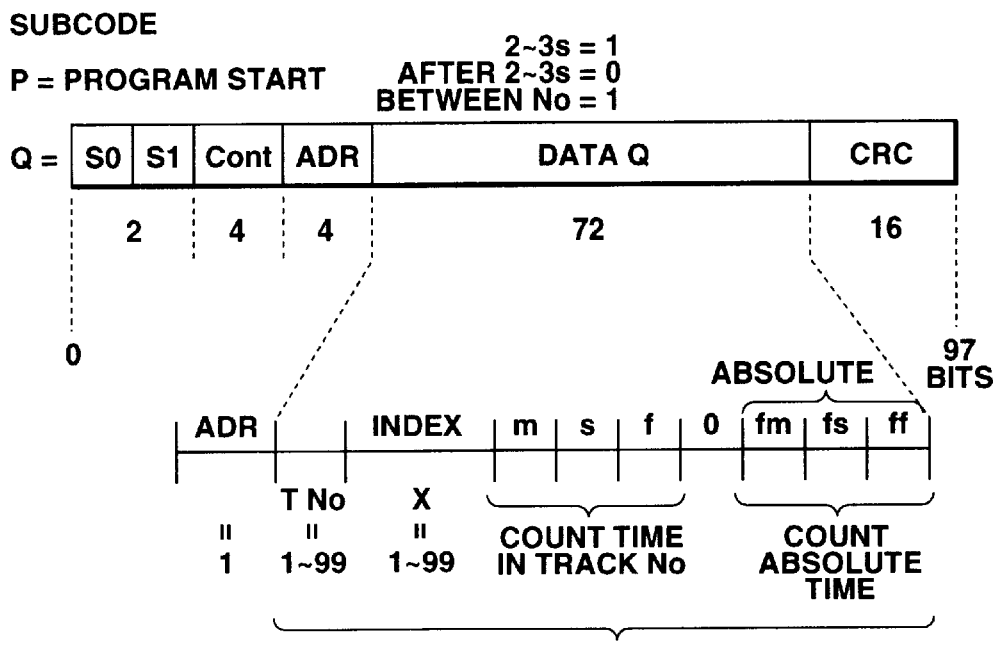
FIG. 12 illustrates a format of a sub-code of a program area.

Referring to FIG. 11, each block of a program area 205 is made up of 98 frames each comprised of frame synchronization, subcode, 24-byte data and 8-byte parity. The subcode of the program area 205 is arranged as shown in FIG. 12. The subcode differs from the TOC of FIGS. 8 and 9 in the track numbers of FIGS. 8 and 9 such that TNo=1 to 99, the point portion of FIGS. 8 and 9 such that the index (X=1 to 99), the time count information in the lead-in of FIGS. 8 and 9 which becomes the time count information in the lead-in, and the absolute time of the contents of the point of FIGS. 8 and 9 which becomes the absolute time (min(fm), second (fs) and frame number (ff)) from the first track.

By referring to these subcodes, it becomes possible to discriminate the temporal recording position of each block on the disc, and whether or not the data recorded in the Q-portion is the CD-DA data or the CD-ROM data.

The block format of the program area 205 is the same for the CD-DA area 203 and the CD-ROM area 202. However, as for the data structure of the CD-ROM area 202, three modes, that is mode 1, mode 1 and mode 3, are prescribed, as shown in FIG. 13.

For the mode 0, all data other than the synchronization signal and the header are all 0 data and are used as a dummy block in case the lead-in and lead-out are of the CD-ROM structure. The mode 1 is a mode used for recording the common computer data. This mode uses an auxiliary data area for introducing codes for error detection and correction for improving data quality over audio data, that is for enabling error correction of higher precision. In this mode 1, the error detection codes are checked and processing employing this error correction code is carried out only when an error has been caused in the user data. If there is no error, 2048 bytes of user data can be continuously read out. The CD-DA data is adapted to be corrected for errors by CIRC with an error rate of the order of $10^{-9}$. The precision of this order is sufficient for CD-DA data in view of the human auditory sense. However, higher precision is required of the computer data. Thus, further error correction codes are appended to the CD-ROM data as shown in FIG. 13 for thereby realizing an error rate of the order of $10^{-12}$.

The mode 2 is a mode opened to the user except the synchronization signal and the header. This mode can be used for recording data which is not objectionable with an error rate obtained by CIRC error correction of the CD ($10^{-11}$ or less). However, form 1 and form 2 are provided for introducing the audio data and the video data as the CD-ROM data. As for the audio data, level B (4 bits and 37.8 kHz sampling) and level C (4 bits and 18.9 kHz sampling) are provided as the ADPCM (adaptive differential PCM) specifications. The form 1 and the form 2 are also used for the CD-I (CD-Interactive) and provide a subheader (8 bytes) for housing various flags for real-time processing in user data. This enables block-based time-divisional multiplexing recording of audio, video and computer data. The form 1, defined by the subheader information, is used for recording data in need of higher reliability, such as computer data, and uses the same error detection and error correction codes as those of the mode 1. The form 2 is intended for housing data in need of interpolation for errors, such as audio and video data, and can all be used as user data except the 4-byte reserved data. The sub-header is formed by eight bytes and configured as dual recording of four bytes. Each one byte is allocated to the file number, channel number, submode and data type. In particular, the file number has such characteristics that, since the blocks belonging to the same file are recorded with the same file number despite physical interleaving, the block can coexist with other blocks, such that, if a block recording the audio data is interleaved in a manner proper to real-time processing, only blocks of the same file can be read out. Since the channel number can record the values proper to the same file, it can be used for selecting the pertinent required block. The submode records a flag specifying block attributes and is used when it is necessary to distinguish data in a block. The identification signal for the forms 1 and 2 are also contained in the submode. The data type records flags specifying attributes of various data. The data structure of the CD-ROM area 202 is classified into mode 0, mode 1, mode 2, form 1 and form 2, depending n the types of recording data, such that an optimum format can be selected and used.

As for the file format in the CD-ROM area 202, the file is large-sized and the number of files also tends to be voluminous. Therefore, the file format is of a hierarchical structure based on root directories. Specifically, a distributed subdirectory structure for housing files under several layers of subdirectory or a path table for shortening the file accessing time is used. Taking an illustrative description of a volume descriptor, this descriptor is made up of a system (volume) discriminating portion, the volume information, path table information and the authoring information. The system discriminating portion specifies the disc label, volume ID and so forth, while the volume information is configured for specifying the system (volume) name, volume size and the logical block length. The path table information describes the path table size to the path table address, while the authoring information is configured for stating the identification for a publisher, copyright file name and the issue data of the volume.

Figure 14:
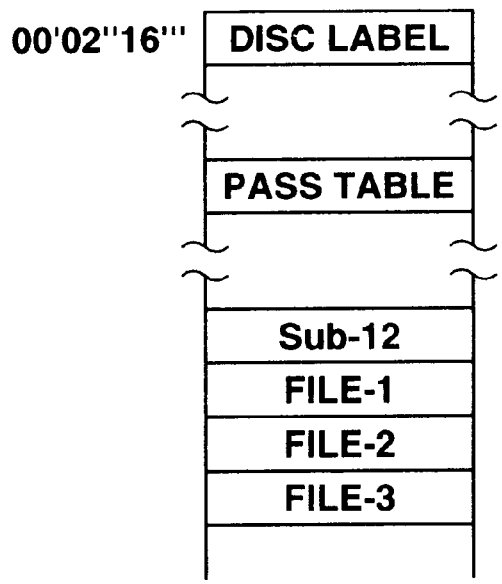
FIG. 14 illustrates a file accessing method.

For accessing a file, a disc label prescribed in, for example, the physical address of 0 minute 2 second 16 block is read, the address of the path table is checked and captured into a RAM, such as RAM 53 of FIG. 1, as shown in FIG. 14. By this path table, an address of a subdirectory to which belongs the file (such as Sub-12) is checked in order to seek this subdirectory. The file address is checked from this subdirectory as the block is continuously read out therefrom in order to read out the target file (such as file-2). By this technique, a file made up of plural layers can be read out by one seek operation for shortening the file accessing time.

Figure 15:
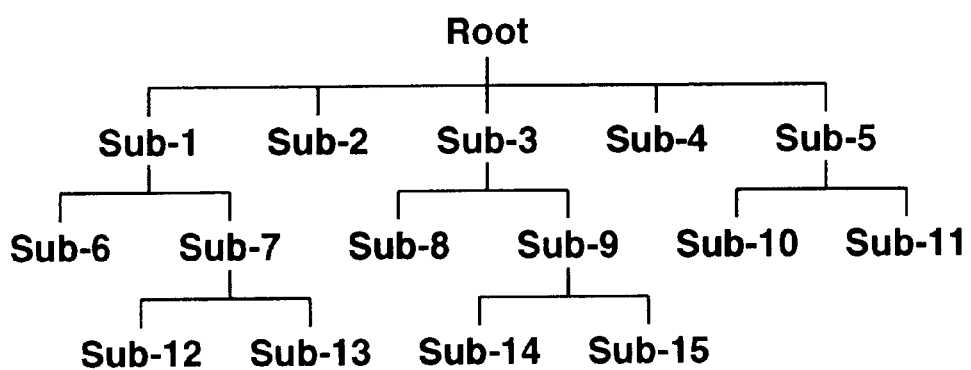
FIG. 15 illustrates an example of a path table.
Figure 16:
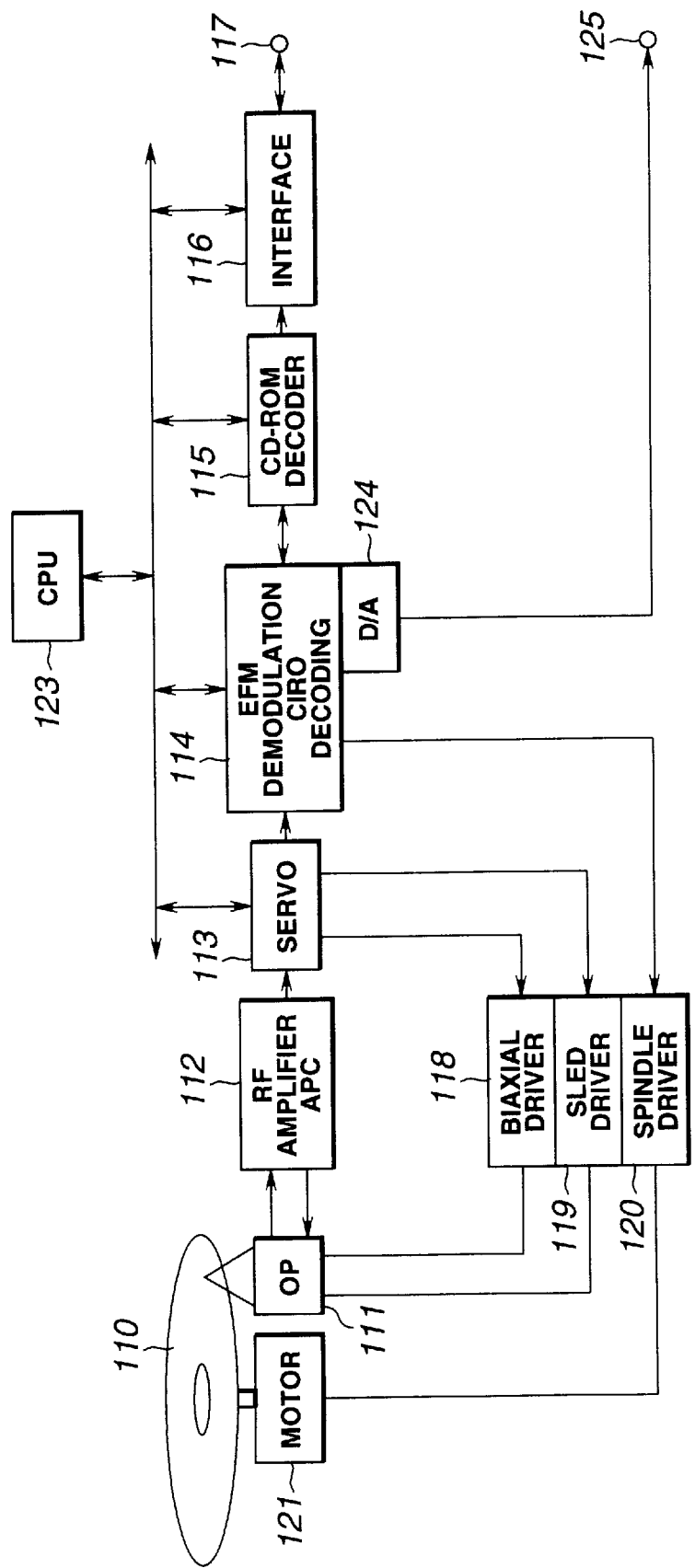
FIG. 16 is a block circuit diagram showing a schematic structure of a conventional disc reproducing device.

A list of positions of all directories is termed a path table, an example of which is shown in FIG. 15. The path table has the combined functions of discriminating the directories from one another and of discriminating the locations thereof from a parent directory. The retrieving order of priority is set depending on the hierarchical directory level, directory numbers of the parent directory and the values of the directory discrimination column to permit fast accessing to respective files.

In the above-described method and device for reproducing a disc according to the present invention, a disc-shaped recording medium (disc 1) is run in rotation at a rotational velocity corresponding to the second reproducing rate (high reproducing rate for CD-ROM data) not only for reproducing first data (CD-DA data) but also for reproducing second data (CD-ROM data), while it is unnecessary to accelerate or decelerate the rotating speed of the disc-shaped recording medium. Thus, the mechanism for running the disc-shaped recording medium in rotation, that is the spindle motor, is relieved of an excess load. Moreover, the first and second data can be reproduced in a short accessing time, while the disc driving mechanism can be extended in service life. Also, the power consumption or the heat evolution may be reduced, while the device size may also be reduced.

Also, in the disc reproducing method and device according to the present invention, the disc-shaped recording medium (disc 1) can be run in rotation at a rotational speed corresponding to at least the second reproducing speed (high reproducing rate of the CD-ROM data), readout means (optical pickup 2) is moved along the radius of the disc-shaped recording medium, responsive to the inputting of a readout command of reading out data of the disc-shaped recording medium for reading out data from the disc-shaped recording medium, the read-out output data is discriminated as to whether it is first data (CD-DA data) or second data (CD-ROM data), the output data is stored at a second reproducing rate in buffer memory means if the output data has been found to be first data, the first data on the buffer memory means is read out at a first reproducing speed, and the second data is accessed and read out if the readout means is not reading out the first data of the disc-shaped recording medium, so that, if a combined disc having the CD-DA data of the CD-DA standard and the CD-ROM data of the CD-ROM standard recorded in separate areas thereof is reproduced, the CD-DA data and the CD-ROM data can be time-divisionally read out in parallel.

The above-described embodiment is directed to a disc reproducing device for reproducing a disc for reading out the CD-DA data and the CD-ROM data. The present invention, however, is not limited to this specified configuration and may be applied to a disc reproducing device in which a MD (Mini-Disc, trade mark) is reproduced for reading out audio data or computer data. That is, the effect similar to that of the present embodiment may be obtained for a disc-shaped recording medium without dependency on the disc type.

Although the above-described embodiment is directed to a disc reproducing device for rotating the disc 1 at a 10-tupled speed for reading out data, the present invention is not limited thereto but may be applied to a disc reproducing device adapted for rotating the disc 1 at a higher speed, such as a 12-tupled speed or a 14-tupled speed.

Also, in the above-described embodiment, both the constant linear velocity and the constant angular velocity can be coped with. However, only one of these two can be adapted to be coped with.

In the above-described embodiment, the data processing sequence is switched depending on whether the reproducing data is the CD-DA data or the CD-ROM data, and the CD-DA data read out from the disc 1 having e.g., a disc rotating speed equal to a 10-tupled speed is converted to the standard data rate as the output rate. However, if data reproduction is interrupted by, for example, vibrations, the data stored in a buffer memory may be outputted for assuring data continuity.

In the above-described embodiment, the readout command corresponding to the user command input is issued by the host computer 56 and the micro-controller 51 reads out the CD-DA data or the CD-ROM data responsive to the readout command from the disc 1. The present invention, however, may be applied to such a configuration in which a data reproducing sequence is programmed in the host computer 56 and the CD-DA data and the CD-ROM data may be alternately reproduced, that is, one musical number of the CD-DA data is reproduced and the CD-ROM data is subsequently reproduced or vice versa.

Also, in the above description, the CD-DA disc, CD-ROM disc and the combined disc are given as examples. However, the disc reproducing device of the present invention may also be used for reproducing a variety of discs, such as a so-called CD-I (Compact Disc Interactive) or a CD-ROM/XA (CD-ROM Extended Architecture) conforming to a CD having a diameter of 12 cm and a thickness of 1.2 mm.

We claim:

1. A disc reproducing device for reproducing a disc-shaped recording medium having recorded thereon at least first data to be reproduced at a first reproducing rate and second data to be reproduced at a second reproducing rate faster than said first reproducing rate, said first data and said second data being recorded separately in plural areas, comprising:

disc-shaped recording medium rotating driving means for rotationally driving said disc-shaped recording medium;

rotating speed controlling means for controlling said disc-shaped recording medium rotating driving means so as to rotate at a rotational speed corresponding to at least said second reproducing rate;

inputting means for inputting a readout command for said first data or the second data;

accessing means for accessing said disc-shaped recording medium for reading out data recorded thereon;

accessing means movement means for moving said accessing means to a desired position in the radial direction of said disc-shaped recording medium;

controlling means for causing said accessing means movement means to move said accessing means based on the readout command for said first data or the second data from said inputting means for causing said accessing means to read out desired data on said disc-shaped recording medium;

output data discriminating means for discriminating whether output data read out from said accessing means is the first data or the second data and for outputting the result of discrimination;

buffer memory means for storing said first data; and buffer memory controlling means for causing said output data at said second reproducing rate to be stored in said buffer memory means if, based on the results of judgment, said output data is the first data, said buffer memory controlling means causing said first data of said buffer memory means to be read out at said first reproducing rate;

said buffer memory controlling means causing said first data of said buffer memory means to be read out at said first reproducing rate, said buffer memory controlling means causing said accessing means to access said second data as desired based on the readout command for said second data from said input means for reading out said second data.

2. The disc reproducing device as claimed in claim 1 wherein the data discrimination information for discriminating whether the data recorded on the disc-shaped recording medium is the first data or the second data is recorded in a table information storage portion recorded on the innermost or the outermost area of said disc-shaped recording medium.

3. The disc reproducing device as claimed in claim 1 further comprising:

occupying data volume monitoring means for monitoring whether the occupying data volume in said buffer memory means has reached a pre-set volume;

said buffer memory controlling means causing writing of said first data n said buffer memory means to be halted when said occupying data volume has reached the pre-set volume.

4. The disc reproducing device as claimed in claim 1 wherein said first data is digital audio data generated on sampling analog audio signals.

5. The disc reproducing device as claimed in claim 1 further comprising:

error correction means for correcting errors of said output data including error correction codes;

said error correction means correcting the errors of said output data by utilizing said buffer memory means.

6. The disc reproducing device as claimed in claim 2 wherein said controlling means causes said accessing means to access said data discrimination information of said table information storage portion;

said output data discriminating means comparing said data discrimination information to said readout command entered from said command inputting means for outputting said results of discrimination.

7. The disc reproducing device as claimed in claim 3 further comprising:

address information storage means for recording the address information therein; and address writing means for writing in said address information storage means the address of said first data not written in said buffer memory means because the occupying data volume has reached said first pre-set volume.

8. The disc reproducing device as claimed in claim 7 wherein, if said occupying data volume monitoring means detects that the occupying data volume in said buffer memory means has reached a second pre-set volume and said address is already written in said address information storage means, said buffer memory controlling means causes the first data of said address to be written in said buffer memory means.

9. A disc reproducing method for reproducing a disc-shaped recording medium having recorded thereon at least first data to be reproduced at a first reproducing rate and second data to be reproduced at a second reproducing rate faster than said first reproducing rate, said first data and said second data being recorded separately in plural areas of the disc-shaped recording medium, comprising:

a disc-shaped recording medium rotating step of rotating said disc-shaped recording medium at a rotating speed at least corresponding to said second reproducing rate;

a command inputting step of inputting a readout command of reading out data on said disc-shaped recording medium;

a first readout step of reading out data on said disc-shaped recording medium by readout means for outputting output data;

a readout means movement step of moving said readout means along the radius of said disc-shaped recording medium for accessing a desired position on said disc-shaped recording medium;

an output data discrimination step of discriminating whether said output data is said first data or the second data and outputting the result of decision;

a storage step of storing said output data in buffer memory means at said second reproducing rate if said output data is the first data, based on the results of discrimination;

a second readout step of reading out said first data of said buffer memory means at said first reproducing rate; and a third readout step of for causing said readout means to access said second data frequency reading put said second data if, when said first data of said buffer memory means is read out at said first reproducing rate, said readout means is not reading out the first data of said disc-shaped recording medium.

10. The disc reproducing method as claimed in claim 9 further comprising:

an occupying data volume monitoring step for monitoring whether the occupying data volume in said buffer memory means has reached a pre-set volume;

a writing stop step of causing writing of said first data in said buffer memory means to be halted when said occupying data volume has reached the pre-set volume; and an address information storage step of storing the address information of said first data not written in said buffer memory means because the occupying data volume has reached said first pre-set volume in said writing stop step.

11. The disc reproducing method as claimed in claim 9 wherein the data discrimination information for discriminating whether the data recorded on the disc-shaped recording medium is the first data or the second data is recorded in a table information storage portion recorded on the innermost or the outermost area of said disc-shaped recording medium;

said output data discrimination step comparing said data discrimination information to said readout command entered in said command inputting step for outputting said result of decision.

12. The disc reproducing method as claimed in claim 9 further comprising:

an error correction step of correcting errors in said output data including the error correction code using aid buffer memory means.

13. The disc reproducing method as claimed in claim 9 further comprising:

a holding step of jumping said readout means by −1 track along the radius of said disc-shaped recording medium for holding said readout means on a pre-set track.

14. The disc reproducing method as claimed in claim 10 further comprising:

a second occupying data volume monitoring step of monitoring whether the occupying data volume of said buffer memory means has reached a second pre-set volume;

an address information readout step of reading out said address information when said occupying data volume has reached said second pre-set volume; and a writing step of writing said first data in said buffer memory means.

* * * * *